(12) United States Patent
Takahara

(10) Patent No.: US 8,005,372 B2
(45) Date of Patent: Aug. 23, 2011

(54) DIFFERENTIAL M PHASE SHIFT KEYING OPTICAL RECEIVING CIRCUIT

(75) Inventor: Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 883 days.

(21) Appl. No.: 11/790,180

(22) Filed: Apr. 24, 2007

(65) Prior Publication Data

US 2008/0069565 A1 Mar. 20, 2008

(30) Foreign Application Priority Data

Sep. 15, 2006 (JP) ................................ 2006-251394

(51) Int. Cl.
*H04B 10/06* (2006.01)
(52) U.S. Cl. ...................................... 398/203; 398/204
(58) Field of Classification Search .......... 398/202–214, 398/155
See application file for complete search history.

(56) References Cited

U.S. PATENT DOCUMENTS

| | | | | |
|---|---|---|---|---|
| 4,501,002 A * | 2/1985 | Auchterlonie | ................. | 375/332 |
| 4,680,778 A * | 7/1987 | Krinock | ................. | 375/344 |
| 4,871,975 A * | 10/1989 | Nawata et al. | ................. | 329/308 |
| 5,131,014 A * | 7/1992 | White | ................. | 375/373 |
| 5,345,216 A * | 9/1994 | Chopra et al. | ............. | 340/146.2 |
| 5,659,412 A * | 8/1997 | Hakki | ................. | 398/152 |
| 5,802,113 A * | 9/1998 | Kim | ................. | 375/326 |
| 5,859,725 A * | 1/1999 | Sugiya et al. | ............ | 359/337.13 |
| 6,057,730 A * | 5/2000 | Yamamoto | ................. | 329/304 |
| 6,271,950 B1* | 8/2001 | Hansen et al. | ................. | 398/154 |
| 6,421,149 B2* | 7/2002 | Tervonen et al. | ................. | 398/9 |
| 6,538,779 B1* | 3/2003 | Takeshita et al. | ................. | 398/27 |
| 6,584,163 B1* | 6/2003 | Myers et al. | ................. | 375/360 |
| 6,621,312 B2* | 9/2003 | Tang et al. | ................. | 327/156 |
| 7,003,066 B1* | 2/2006 | Davies et al. | ................. | 375/376 |
| 7,020,401 B2* | 3/2006 | Sakano et al. | ................. | 398/175 |
| 7,035,344 B2* | 4/2006 | Feher | ................. | 375/271 |
| 7,085,498 B2* | 8/2006 | Lee et al. | ................. | 398/155 |
| 7,139,475 B1* | 11/2006 | Kim et al. | ................. | 398/5 |
| 7,190,908 B2* | 3/2007 | Conway et al. | ................. | 398/188 |
| 7,218,863 B2* | 5/2007 | Lee et al. | ................. | 398/183 |
| 7,277,643 B2* | 10/2007 | Baba et al. | ................. | 398/155 |
| 7,346,279 B1* | 3/2008 | Li et al. | ................. | 398/32 |
| 7,389,055 B1* | 6/2008 | Rickard et al. | ................. | 398/206 |
| 7,444,085 B2* | 10/2008 | Ikeuchi et al. | ................. | 398/202 |
| 7,477,848 B2* | 1/2009 | Ooi et al. | ................. | 398/147 |
| 7,486,752 B1* | 2/2009 | Kwasniewski et al. | ........ | 375/354 |
| 7,532,822 B2* | 5/2009 | Sun et al. | ................. | 398/155 |
| 7,623,796 B2* | 11/2009 | Liu | ................. | 398/202 |
| 7,627,252 B2* | 12/2009 | Sun et al. | ................. | 398/155 |

(Continued)

*Primary Examiner* — Ken N Vanderpuye
*Assistant Examiner* — Danny W Leung
(74) *Attorney, Agent, or Firm* — Fujitsu Patent Center

(57) ABSTRACT

The present invention is a differential M phase shift keying optical receiving circuit to improve an identification property of a signal from an optical front-end unit having a plurality of lines. For this, the differential M phase shift keying optical receiving circuit includes: a light-electricity converter for outputting a plurality of electronic signals in which phase-modulated element is intensity modulated from a received optical signal; a data reproduction unit for reproducing a plurality of data signals synchronized with a common clock signal from the plurality of electronic signals output from the light-electricity converter; a clock signal generation unit for generating the common clock signal to be used for reproducing the plurality of data signals in the data reproduction unit with the use of one of the plurality of electronic signals output from the light-electricity converter; and a selection unit for selecting an electronic signal to be used for generating the common clock signal.

13 Claims, 16 Drawing Sheets

U.S. PATENT DOCUMENTS

| | | | | |
|---|---|---|---|---|
| 7,636,525 | B1* | 12/2009 | Bontu et al. | 398/208 |
| 7,734,196 | B2* | 6/2010 | Takahara | 398/208 |
| 2002/0167897 | A1* | 11/2002 | Tateno et al. | 370/216 |
| 2003/0170028 | A1* | 9/2003 | Mori et al. | 398/79 |
| 2003/0198478 | A1* | 10/2003 | Vrazel et al. | 398/183 |
| 2004/0081470 | A1* | 4/2004 | Griffin | 398/188 |
| 2005/0089331 | A1* | 4/2005 | Margalit | 398/139 |
| 2006/0147218 | A1* | 7/2006 | Domagala | 398/155 |
| 2006/0188043 | A1* | 8/2006 | Zerbe et al. | 375/346 |
| 2006/0193640 | A1* | 8/2006 | Katagiri et al. | 398/188 |
| 2006/0275043 | A1* | 12/2006 | Akashi et al. | 398/208 |
| 2006/0285855 | A1* | 12/2006 | Sun et al. | 398/155 |
| 2007/0047954 | A1* | 3/2007 | Mamyshev | 398/33 |
| 2007/0065157 | A1* | 3/2007 | Katagiri et al. | 398/155 |
| 2007/0071457 | A1* | 3/2007 | Takahara | 398/207 |
| 2007/0098402 | A1* | 5/2007 | Maeda et al. | 398/38 |
| 2007/0297549 | A1* | 12/2007 | Nakahara et al. | 375/355 |
| 2008/0013964 | A1* | 1/2008 | Noheji | 398/202 |
| 2008/0056733 | A1* | 3/2008 | Isomura et al. | 398/209 |
| 2008/0069565 | A1* | 3/2008 | Takahara | 398/79 |
| 2008/0267637 | A1* | 10/2008 | Calabro | 398/203 |
| 2009/0142052 | A1* | 6/2009 | Pegg et al. | 398/26 |
| 2009/0324215 | A1* | 12/2009 | Yin | 398/2 |
| 2010/0003036 | A1* | 1/2010 | Kuwata et al. | 398/183 |

* cited by examiner

FIG. 16
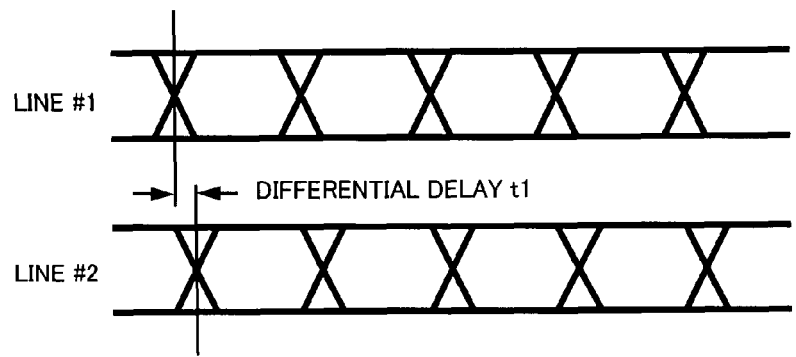
CASE WHERE THERE IS DIFFERENTIAL DELAY OF t1 BETWEEN SIGNAL OF LINE #1 AND SIGNAL OF LINE #2 IN A INPUT UNIT FOR INPUTTING DFFS 105b AND 105c
DETERIORATION OF EFFECTIVE PHASE MARGIN
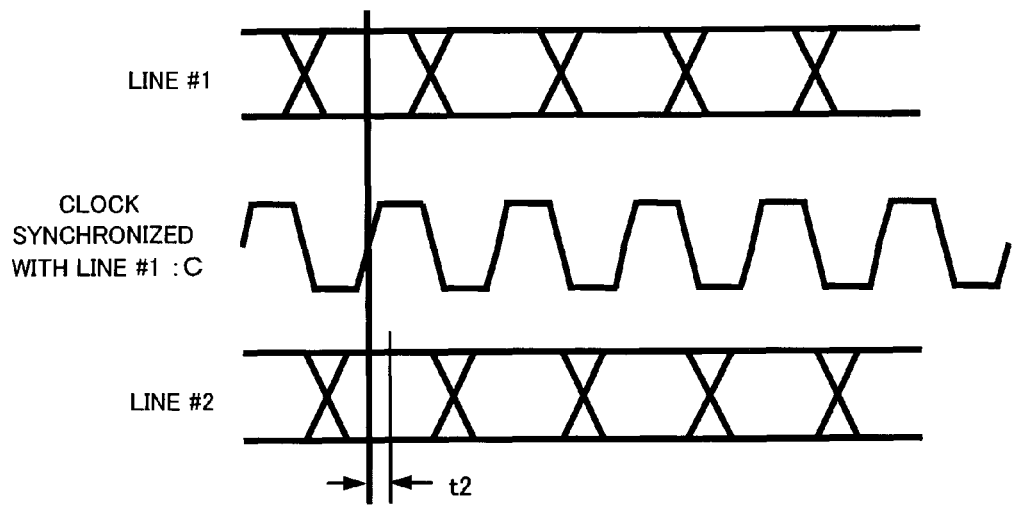

DIFFERENTIAL M PHASE SHIFT KEYING OPTICAL RECEIVING CIRCUIT

BACKGROUND OF THE INVENTION

1) Field of the Invention

The present invention relates to a differential M phase shift keying optical receiving circuit, more particularly, to a differential M phase shift keying optical receiving circuit suitable to be applied to an optical receiver in an optical communication system.

2) Description of the Related Art

Recently, as the Internet becomes more widely used, demands for wider band of an optical communication network have been increasing. Since the optical communication network is used in core network trains or the like, it should be adapted to a long distance communication and a high-speed communication with a wide band. However, according to conventional methods, it is assumed that there is limitation of possibility of wider bands due to influences of chromatic dispersions of optical fibers and nonlinear effects.

In order to solve this problem, an effort to widen the band by devising optical signal modulation methods not by directly suppressing its physical effects is proposed (for example, see US Patent Application Laid-Open No. 2004/0081470). According to this proposal, the method used as an optical signal modulation method is a differential M phase shift keying upon M=$2^n$ where n is an integer equal to or more than 2. Further, a method in which the n is set as n=2 (M=4) is called DQPSK (Differential Quadrature Phase Shift Keying) modulation system.

FIG. 15 is a diagram showing a typical structure of a DQPSK optical receiving circuit 100 of DQPSK modulation system. According to the optical receiving circuit 100 shown in FIG. 15, an optical splitter 101 bifurcates an optical signal modulated by the DQPSK modulation system and a $\pi/4$ delay interferometer 102-1 and a $-\pi/4$ delay interferometer 102-2 respectively perform a delay interfering process for the optical signal bifurcated by the optical splitter 101. Further, balanced photodiodes 103-1, 103-2 convert the light which is delay interfered in the delay interferometers 102-1, 102-2 into electronic signals (current signals).

A DQPSK signal employs optical phases of $\pi/4$, $3\pi/4$, $-\pi/4$, and $-3\pi/4$ as a relative phase value for a signal of one prior symbol. The $\pi/4$ delay interferometer 102-1 and the $-\pi/4$ delay interferometer 102-2 relatively give a $\pi/2$ differential delay to the optical signal from the optical splitter 101. Accordingly, the balanced photodiode 103-1 of line #1 in which the $\pi/4$ delay interferometer 102-1 is provided outputs an electronic signal in which phase changes of $\pi/4$ and $-3\pi/4$ of the optical signal are converted into intensity change. On the other hand, the balanced photodiode 103-2 of line #2 in which the $-\pi/4$ delay interferometer 102-2 is provided outputs an electronic signal in which phase change of $-\pi/4$ and $3\pi/4$ of the optical signal (orthogonal component for phase changes of $\pi/4$ and $-3\pi/4$) are converted into intensity change.

Transimpedance amplifiers (TIAs) 104-1, 104-2 respectively convert the current signals from the balanced photodiodes 103-1, 103-2 into voltage signals. Then, a clock and data recovery (CaDR) unit 105 digitizes the electronic signals from the TIAs 104-1, 104-2 and a multiplex unit (MUX) 106 performs a logical process or the like to restore the original signal.

Here, the CaDR unit 105 includes a clock recovery (CR) 105a for extracting a clock signal from an input signal of line #1 from the TIA 104-1 and DFFs (D-FlipFlop) 105b, 105c for outputting, as synchronizing with the clock signal in the clock recovery 105a, digital signals in which levels of the input signals of lines #1, #2 from the TIAs 104-1, 104-2 are identified.

As described above, according to the DQPSK optical receiving circuit 100 shown in FIG. 15, input signals of two lines (line #1, line #2) are input in the CaDR unit 105 and the CaDR unit 105 is configured to extract a common clock from the input signal of line #1 and identifies input signals of lines #1 and #2.

However, according to the DQPSK optical receiving circuit 100 shown in FIG. 15, a clock signal to be extracted is deteriorated when gain property of the optical front-end unit (reference numerals 102-1, 103-1) in line #1 or an error of delay property occurs in delay interferometer 102-1. Accordingly, there is a problem that, even when the gain property and the delay property in the optical front-end unit (reference numerals 102-2, 103-2) in line #2 are normal, identification property of not only the signal of line #1 but also the signal of line #2 may be deteriorated in the digitization unit 105.

Further, when a gain property reduction or an error delay property occurs, as described above, in the optical front-end unit of lines #1, #2, as shown in FIG. 16, a phase shifting t1 (that is, a phase shifting $\pi/2$ from phase difference) of the input signals of lines #1, #2 addressed to the digitization unit 105 may occur. This phase shifting corresponds to a relative identifying shift t2 in the digitization unit 105. That is, there is another problem that, regarding the signal of line #1 in which clock C is extracted from a signal of the own line, identification can be implemented at an appropriate identification timing in the DFF 105b; however, regarding the signal of line #2 in which the clock is not extracted from the signal of the own line, an effective identification phase margin in the DFF 105c may be deteriorated.

SUMMARY OF THE INVENTION

The present invention has been made in view of such problems and has an object to improve an identification property of a signal from an optical front-end unit having a plurality of lines.

Another object of the present invention is to improve an effective phase margin of the signal from the optical front-end unit having the plurality of lines.

(1) Accordingly, a differential M phase shift keying optical receiving circuit of the present invention is a differential M phase shift keying optical receiving circuit for receiving an optical signal which is differential M phase modulated upon M=2n where n is an integer equal to or greater than 2, including: a optical-electrical converter for outputting a plurality of electronic signals in which phase-modulated element is intensity modulated from a received optical signal; a data regeneration unit for regenerating a plurality of data signals synchronized with a common clock signal from the plurality of electronic signals output from the optical-electrical converter; a clock recovery unit for generating the common clock signal to be used for regenerating the plurality of data signals in the data regeneration unit with the use of one of the plurality of electronic signals output from the optical-electrical converter; and a selection unit for selecting an electronic signal to be used for generating the common clock signal.

(2) Here, the clock recovery unit may be a clock signal extraction unit for extracting a clock signal element included in the electronic signal selected in the selection unit and for supplying the extracted clock signal element to the data regeneration unit as the common clock signal.

(3) The clock recovery unit may include a clock oscillation unit for generating a clock signal having frequency corresponding to an input control signal and a plurality of phase comparison units for detecting a phase difference between a clock signal generated in the clock oscillation unit and the plurality of electronic signals output from the optical-electrical converter by a phase comparison and for outputting a signal corresponding to the phase difference. The selection unit may be configured to supply a signal corresponding to the phase difference of the electronic signal selected among the signals from the plurality of phase comparison units as the control signal addressed to the clock oscillation unit. The clock oscillation unit may supply a clock signal generated corresponding to the control signal from the selection unit to the data regeneration unit as the common clock signal.

(4) Further, a selection control unit for controlling a selection of the electronic signal to be used for generating the common clock signal in the selection unit may be included.

(5) In this case, the selection control unit may include a monitor for monitoring the plurality of electronic signals output from the optical-electrical converter and a control signal output unit for outputting a control signal for controlling the selection of the electronic signal in the selection unit based on a monitoring result in the monitor.

(6) The monitor may be composed of a power monitor for monitoring an average power of each electronic signal output from the optical-electrical converter.

(7) The control signal output unit of the selection control unit may output the control signal to the selection unit so as to select an electronic signal having a largest average power based on the average power monitoring result.

(8) Or, the control signal output unit of the selection control unit may select one of the plurality of electronic signals by default and output the control signal to the selection unit so as to switch the selection to another electronic signal other than the selected electronic signal when an average power of the selected electronic signal is equal to or smaller than a predetermined threshold.

(9) In the case of the above item (5), the monitor may be composed of a waveform monitor for monitoring a waveform of each electronic signal output from the optical-electrical converter.

(10) In this case, the waveform monitor may detect an average power of each electronic signal output from the optical-electrical converter and a peak value of each electronic signal output from the optical-electrical converter.

(11) The selection control unit may control the selection unit so as to select one of the plurality of electronic signals by default and to switch the selection to another electronic signal other than the selected electronic signal when an average power detected by the waveform monitor and a peak value detected by the peak detection circuit of the selected electronic signal are respectively equal to or smaller than the predetermined threshold.

(12) In the case of the above item (4), the selection control unit may control the selection in the selection unit according to a bit error rate of data reproduced by the data regeneration unit.

(13) In the case of the above item (1), n may be set as 2 so that M=4; the optical-electrical converter may output two electronic signals in which phase-modulated element is intensity modulated from the received optical signal; the data regeneration unit may reproduce two data signals synchronized with the common clock signal from the two electronic signals output from the optical-electrical converter; the clock recovery unit may generate the common clock signal to be used for regenerating the two data signals in the data regeneration unit with the use of one of the two electronic signals output from the optical-electrical converter; and the selection unit may selectively output one of the two electronic signals output from the optical-electrical converter to the clock recovery unit for generating the common clock signal.

(14) Further, the differential M phase shift keying optical receiving circuit of the present invention may be a differential M phase shift keying optical receiving circuit for receiving an optical signal which is differential M phase modulated upon $M=2^n$ where n is an integer equal to or greater than 2, including: a optical-electrical converter for outputting a plurality of electronic signals in which a phase-modulated element is intensity modulated from a received optical signal; a data regeneration unit for regenerating a plurality of data signals synchronized with a common clock signal from the plurality of electronic signals output from the optical-electrical converter; and a clock recovery unit for generating the common clock signal to be used for regenerating the plurality of data signals in the data regeneration unit. The clock recovery unit may include a clock oscillation unit for generating a clock signal having frequency corresponding to an input control signal, a plurality of phase comparison units for detecting a phase difference between a clock signal generated in the clock oscillation unit and the plurality of electronic signals output from the optical-electrical converter by a phase comparison and outputting a signal having a value corresponding to the phase difference, and an average calculation circuit for calculating an average of values of signals corresponding to the phase difference from the phase comparison units and supplying a signal indicating the calculation result to the clock oscillation unit as the control signal. The clock oscillation unit may supply the clock signal generated according to the control signal from the average calculation circuit to the data regeneration unit as the common clock signal.

(15) Further, n may be set as 2 so that M=4; the optical-electrical converter may output two electronic signals in which a phase-modulated element is intensity modulated from the received optical signal; the data regeneration unit may reproduce two data signals synchronized with the common clock signals from the two electronic signals output from the optical-electrical converter; the clock recovery unit may generate the common clock signal to be used for generating the two data signals in the data regeneration unit; the plurality of phase comparison units may include two phase comparison units for detecting a phase difference between the clock signal generated in the clock oscillation unit and the two electronic signals output from the optical-electrical converter by a phase comparison and respectively outputting signals having values corresponding to the phase differences; and the average calculation circuit may calculate an average of signals having values corresponding to the phase differences from the two phase comparison units and supply a signal having a value indicating the average calculation result to the clock oscillation unit as the control signal.

(16) In the case of the above (14), a weighting unit for giving weighting individually to signals having values corresponding to the phase differences output from the plurality of phase comparison units; and a weighting control unit for controlling weighting given from the weighting unit may be further included. The average calculation circuit may calculate the average of the signals having values corresponding to the phase differences to which the weighting is given in the weighting unit.

(17) Or, the weighting control unit may include an electronic signal monitor for monitoring the plurality of electronic signals output from the optical-electrical converter and a weighting control signal output unit for outputting a control signal used for individually weighting signals having values corresponding to the phase differences output from the plurality of phase comparison units in the weighting unit based on the monitoring result of the electronic signal monitor.

(18) Further, the weighting control unit may include a reproduced data monitor for monitoring the plurality of data signals reproduced in the data regeneration unit, and a weighting control signal output unit for outputting a control signal for individually weighing signals having the values corresponding to the phase differences output from the plurality of phase comparison units in the weighting unit based on the monitoring result in the reproduced data monitor.

As described above, according to the present invention, since a selection unit can select an electronic signal to be used for generating a common clock signal in a clock recovery unit, the common clock signal used in the data regeneration unit may be extracted from signals having more favorable properties so that there is an advantage that an identification property of a signal from the optical front-end having a plurality of lines can be improved.

Further, according to the present invention, an average calculation circuit calculates an average of signals of values corresponding to phase differences from a plurality of phase comparison circuits and supplies a signal indicating the calculation result to a clock oscillator as a control signal and the clock oscillator supplies the clock signal generated according to the control signal from the average calculation circuit to a data regeneration unit as a common clock signal. Accordingly, there are advantages that the identification property of the signal from the optical front-end unit having the plurality of lines can be improved and that an effective phase margin of identification timing for electronic signal in other lines can be improved, compared to a case that clock signal is extracted from an electronic signal of only one line.

BRIEF DESCRIPTION OF THE DRAWINGS

FIG. 16 is an explanatory diagram of an object to be solved by the present invention.

DESCRIPTION OF THE PREFERRED EMBODIMENTS

Embodiments of the present invention will be described with reference to the drawings.

Here, it is noted that the present invention should not be limited to the following embodiments. In addition to the above-described object of the present invention, other technical objects and means for solving the technical problems, operation, and effects will be clear in the following description of the embodiments.

(a) First Embodiment

Figure 1:
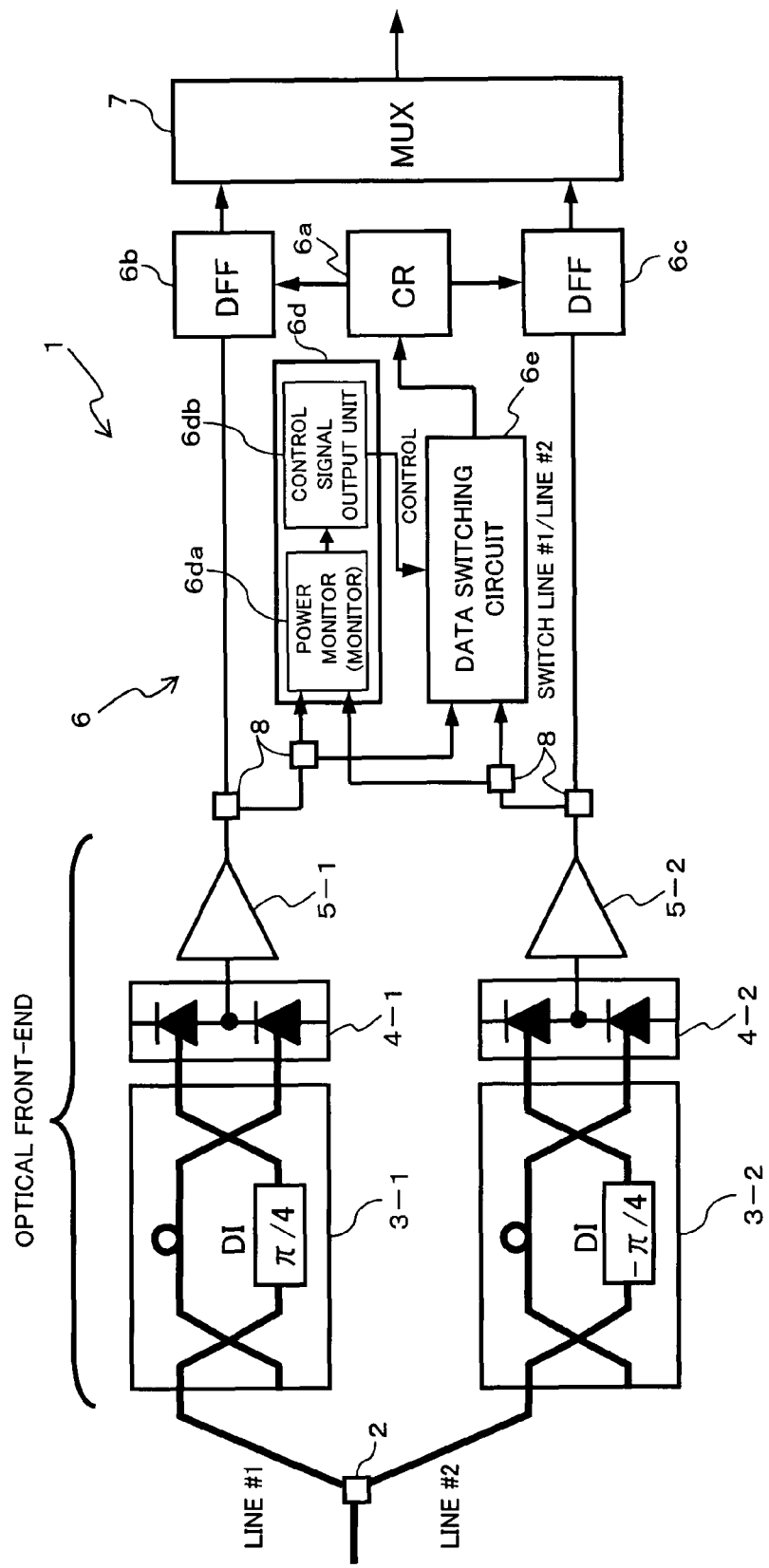
FIG. 1 is a diagram showing a DQPSK optical receiving circuit according to a first embodiment of the present invention.
Figure 15:
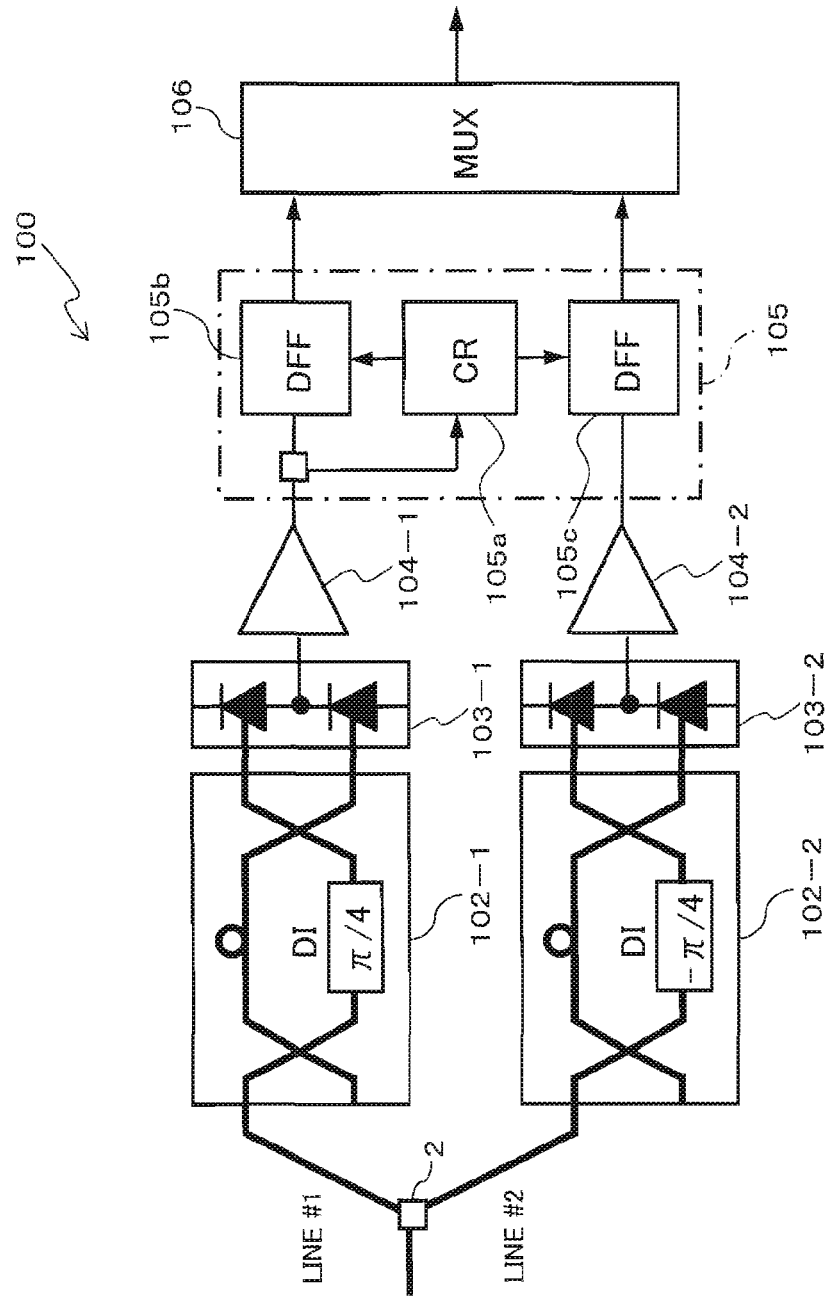
FIG. 15 is a diagram showing a typical structure of a DQPSK optical receiving circuit.

FIG. 1 is a diagram showing a DQPSK optical receiving circuit according to a first embodiment of the present invention. The DQPSK optical receiving circuit 1 shown in FIG. 1 is a differential quadrature phase shift keying optical receiving circuit for receiving an optical signal which is differential quadrature phase shift keying modulated (DQPSK modulation), upon n is set as 2 so that $M=2^2=4$. The DQPSK optical receiving circuit 1 shown in FIG. 1 includes a digitization unit 6 that is different from what is described in FIG. 15. The reference numeral 8 represents electrical contacts. Here, an optical splitter 2, delay interferometers 3-1, 3-2, balanced photodiodes 4-1, 4-2, transimpedance amplifiers (TIAs) 5-1, 5-2, and an MUX 7 are the same with those shown in FIG. 15 (reference numerals 101, 102-1, 102-2, 103-1, 103-2, 104-1, 104-2, and 106).

That is, an optical front-end which is composed of two lines of the delay interferometers 3-1, 3-2, the balanced photodiodes 4-1, 4-2 and the TIAs 5-1, 5-2 constitute an optical-electrical converter for outputting two electronic signals in which a phase-modulated element is intensity-modulated from an optical signal received by the optical splitter 2.

In the digitization unit 6, input electronic signals in two lines (line #1 and line #2) are input from the TIAs 5-1, 5-2 and a common clock signal is set. With the use of the determined clock signal, the levels of the digital signals of two lines are identified and respectively output. The digitization unit 6 includes a selection control unit 6*d* and data switching circuit 6*e* in addition to a clock recovery 6*a*, and DFFs 6*b*, 6*c* which are basically the same with those shown in FIG. 15 (reference numerals 105*a* to 105*c*).

The data switching circuit 6*e* selectively outputs one of the two line electronic signals from the TIAs 5-1, 5-2 to the clock recovery 6*a* based on a selection control signal from a selection control unit 6d which will be described later. Thus, the data switching circuit 6e constitutes a selection unit for selecting an electronic signal to be used for generating the common clock signal.

Further, the selection control unit 6d includes a monitor 6da for monitoring signal characteristics of two line electronic signals output from the TIAs 5-1, 5-2 as a optical-electrical converter and a control signal output unit 6db for outputting a signal (selection control signal) for controlling the selection in the data switching circuit 6e to the data switching circuit 6e based on the monitoring results of the monitor 6da. Accordingly, in the selection control unit 6d, the signal characteristics of the two electronic signals are monitored and, according to the monitoring results, selection of electronic signals for generating common clock signal in the data switching circuit 6e can be controlled.

Further, the clock recovery (CR) 6a extracts a clock signal from the electronic signal selected by the data switching circuit 6e as described above and outputs as the common clock signal for identification of two line electronic signals to the DFFs 6b, 6c.

Thus, the clock recovery 6a functions as a clock recovery unit for generating a common clock signal to be used for regenerating two data signals in the DFFs 6b, 6c, with the use of one of the two electronic signals output from the TIAs 5-1, 5-2 as the optical-electrical converter. Also, the clock recovery 6a functions as a clock signal extraction unit for extracting a clock signal element included in the electronic signal selected by the data switching circuit 6e and for supplying the extracted clock signal to the DFFs 6b, 6c as a common clock signal.

Further, the DFFs 6b, 6c may output digital signals synchronized with the common clock signal extracted by the clock recovery 6a for each of the signal of line #1 and the signal of line #2 from the TIAs 5-1, 5-2. Thus, the DFFs 6b, 6c constitute a data regeneration unit for regenerating two data signals synchronized with the common clock signal from the two electronic signals output from the TIAs 5-1, 5-2 as the optical-electrical converter.

Here, the control signal output unit 6db of the selection control unit 6d may output a selection control signal to the data switching circuit 6e so as to extract a clock signal in the order of most preferable monitoring result of signal characteristics or may output selection control signal to the data switching circuit 6e so as to select a first signal (for example, the signal of the line #1) by default and to select a second signal (here, the signal of line #2) when the monitoring result of signal characteristics of the selected signal is lower than a predetermined value.

Further, the monitor 6da of the selection control unit 6d may be provided as, for example, a power monitor 6da for monitoring an average power of the two electronic signals (input signals of lines #1, #2 from the TIAs 5-1, 5-2).

Figure 2:
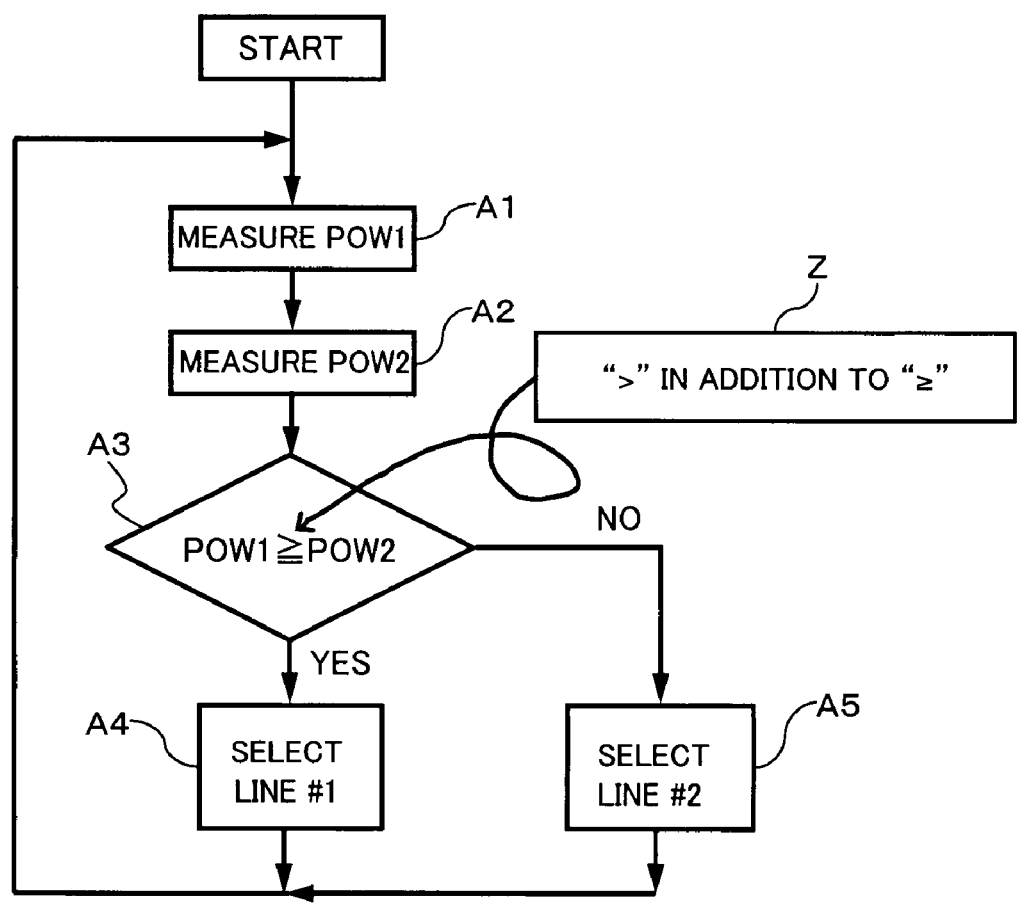
FIG. 2 is a flow chart showing an example of a controlling aspect for a data switching circuit in a control signal output unit according to the first embodiment of the present invention.

FIG. 2 is a flow chart showing an example of a controlling aspect for the data switching circuit 6e by the control signal output unit 6db according to the monitoring results of the power monitor 6da where the monitor 6da is provided as a power monitor.

In the controlling aspect shown in FIG. 2, the control signal output unit 6db is configured to control the data switching circuit 6e as a selection unit so as to select an electronic signal having the largest average power based on the monitoring results of average power.

In more detail, the power monitor 6da measures an average power POW1 of the input signal of line #1 from the TIA 5-1 and average power POW2 of the input signal of line #2 from the TIA 5-2 (steps A1 and A2) and the control signal output unit 6db outputs a selection of line #2 from the TIA 5-2 (steps A1 and A2) and the control signal output unit 6db outputs a selection control signal to the data switching circuit 6e so as to select a signal having larger average power based on the monitoring results.

That is, when the average power POW1 of the input signal of line #1 is equal to or greater than the average power POW2 of the input signal of Line #2 (POW1≧POW2), the control signal output unit 6db outputs a selection control signal such that the data switching circuit 6e selects the input signal of line #1 (step A3 to step A4 via route of "YES"). On the other hand, when the average power POW1 of the input signal of line #1 is smaller than the average power POW2 of the input signal of line #2 (POW1<POW2), the control signal output unit 6db outputs selection control signal such that the data switching circuit 6e selects the input signal of line #2 for extracting a clock signal (step A3 to step A5 via route of "NO").

Regarding the comparative judgment of the average power in the power monitor 6da, when the average power POW1 of the input signal of line #1 is greater than the average power POW2 of the input signal of line #2 (POW1>POW2), the data switching circuit 6e may output a selection control signal to the data switching circuit 6e so as to select the input signal of line #1. On the other hand, when the average power POW1 of the input signal of line #1 is equal to or smaller than the average power POW2 of the input signal of line #2 (POW1≦POW2), the data switching circuit 6e may output a selection control signal to the data switching circuit 6e so as to select the input signal of line #2 (See Z in FIG. 2).

Figure 3:
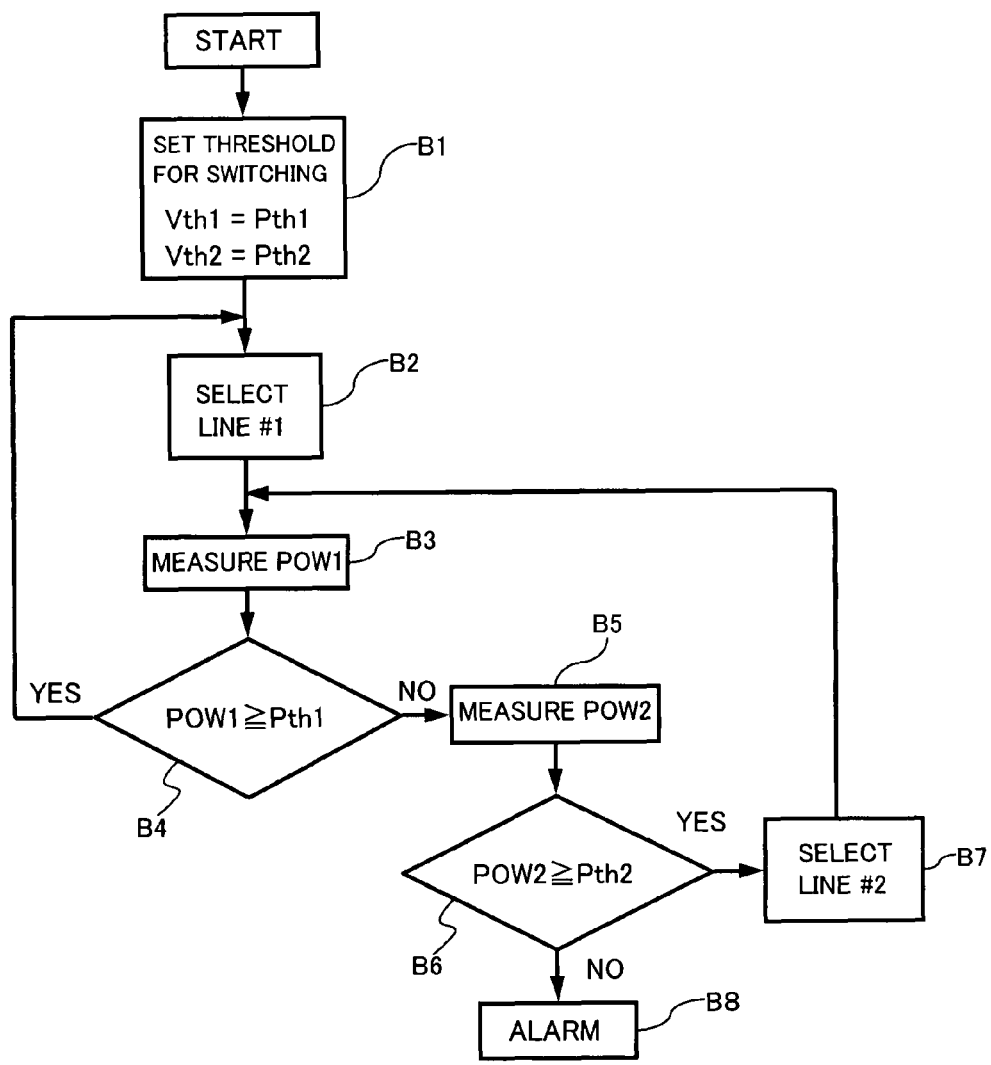
FIG. 3 is a flow chart showing another example of the controlling aspect for a data switching circuit in a control signal output unit according to the first embodiment of the present invention.

FIG. 3 is a flow chart showing another example of the controlling aspect for the data switching circuit 6e implemented by the control signal output unit 6db according to the monitoring results in the power monitor 6da when the monitor is provided as the power monitor 6da.

In the controlling aspect shown in FIG. 3, a selection control signal is output to the data switching circuit 6e so that one of two electronic signals (for example, the electronic signal of line #1) is selected by default and, when an average power of the selected electronic signal is equal to or smaller than the threshold, the selection is switched to the other electronic signal (here, the electronic signal of line #2).

In more detail, in the control signal output unit 6db, the thresholds to be compared with the average powers POW1, POW2 of the input signals of lines #1, #2 are set as Pth1, Pth2 and these are used as a trigger for switching selection of the input signals of line #1, #2 in the data switching circuit 6e (step B). Then, the average power POW1 of signal of line #1 which is set by default in the data switching circuit 6e (step B2) is measured by the power monitor 6da (step B3) and the control signal output unit 6db compares the measured result and the corresponding threshold Pth1 (step B4).

According to the comparison result in the control signal output unit 6db, when the measured result POW1 of the average power of the signal of line #1 is equal to or greater than the threshold Pth1 (POW1≧Pth1), the measured result is considered to be normal so that the selection of signal of line #1 is appropriate for extracting a clock signal. Accordingly, in the control signal output unit 6db, selection control signal for switching the selection is not output to the data switching circuit 6e (step B4, route of "YES").

On the other hand, when the measured result POW1 of the average power of the signal of line #1 is smaller than the threshold Pth1 (POW1<Pth1), it is considered that gain property, delay property, or the like in the optical front-end (reference numerals 102-1, 103-1) outputting the signal of line #1 are out of appropriate range and that selection of signal of line

1 is not appropriate for extracting a clock signal. Accordingly, on the assumption that the average power of the signal of line #2 is in normal condition, the data switching circuit 6*e* switches the signal used for extracting from the electronic signal of line #1 to the electronic signal of line #2.

That is, the power monitor 6*da* measures the average power POW2 of the signal of line #2 (step B5), the control signal output unit 6*db* compares the measured result POW2 with the corresponding threshold Pth2 (step B6). Here, when the measured result POW2 of the average power of the signal of line #2 is equal to or larger than the threshold Pth2 (POW2≧Pth2), it is considered that gain property, delay property, or the like in the optical front-end (reference numerals 102-2, 103-2) outputting the signal of line #2 are within an appropriate range so that the control signal output unit 6*db* outputs a selection control signal to the data switching circuit 6*e* and switches the electronic signal to be used for extracting a clock signal to the electronic signal of line #2 (step B6 to step B7 via route of "YES"). Here, when the measured result of the average power of the signal of line #2 is smaller than the threshold Pth2 (POW2<Pth2), it is considered that the gain property, delay property, and the like in the optical front-end (reference numerals 102-2, 103-2) of the signal of line #2 are out of the appropriate range. In this case, an alarm signal is output (step B6 to step B8 via route of "NO").

When POW1=Pth1, the signal used for extracting a clock signal may be switched from the electronic signal of line #1 to the electronic signal of line #2 on the assumption that the average power of the signal of line #2 is normal. When POW2=Pth2, a selection control signal may be output so as to select the signal of line #2 without outputting an alarm signal. Further, the above-described Pth1 and Pth2 may be set as the same value or different values according to the characteristic of the optical front-end.

In the above-described DQPSK optical receiving circuit 1 according to the first embodiment, the received DQPSK modulated light is demodulated in the optical front-ends of the lines #1, #2 respectively.

As the optical front-end of the line #1, the delay interferometer 3-1 performs a delay interfering process and the balanced photodiode 4-1 detects a light-electricity conversion so that an electronic signal (of the line #1) in which the phase change of $\pi/4$ and $-3\pi/4$ in the optical signal is converted to intensity change is output. On the other hand, as the optical front-end of the line #1, the delay interferometer 3-1 performs a delay interfering process and the balanced photodiode 4-1 detects a light-electricity conversion so that an electronic signal (of the line #2) in which the phase change of $-\pi/4$ and $3\pi/4$ in the optical signal is converted to intensity change is output.

In the digitization unit 6, the electronic signals of lines #1, #2 which are input through the TIAs 5-1, 5-2 is converted to a digital signal synchronized with a common clock signal of frequency corresponding to the bit rate and output to the MUX 7. In this case, the data switching circuit 6*e* receives the selection control signal (selection control signal output from the control signal output unit 6*db* based on the monitoring results of the monitor 6*da*) from the selection control unit 6*d* and outputs one of the electronic signals from the TIAs 5-1, 5-2 to the clock recovery 6*a* for extracting a clock signal.

As described above, according to the first embodiment of the present invention, since the data switching circuit 6*e* as a selection unit selects an electronic signal to be used for generating a common clock signal in the clock recovery 6*a*, there is an advantage that a common clock signal used in the DFFs 6*b*, 6*c* for digitizing the signals of lines #1, #2 can be extracted in the order of signals having more favorable properties and that identification properties in a signal from the optical front-end unit including two lines can be improved.

(b) Second Embodiment

Figure 4:
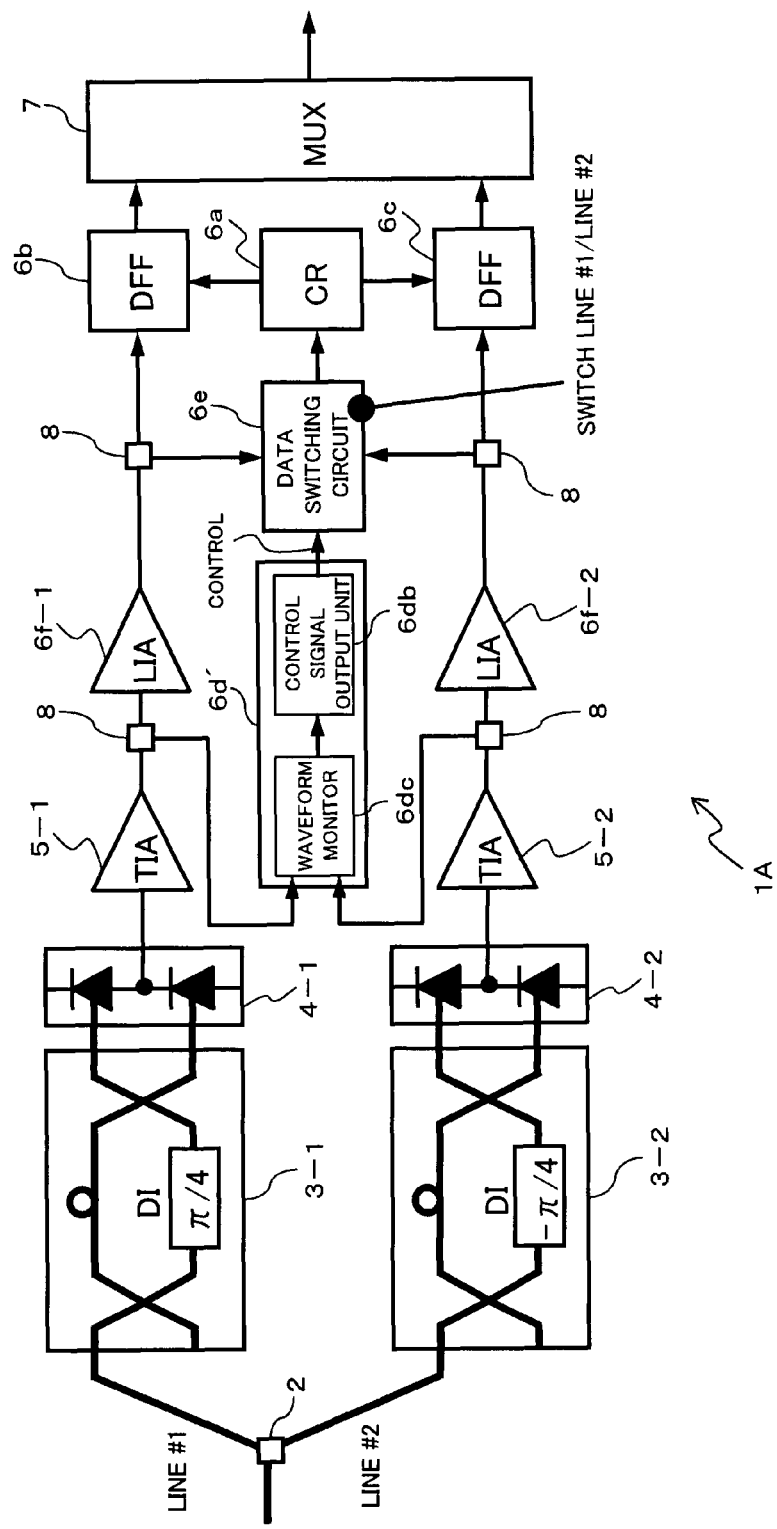
FIG. 4 is a diagram showing a DQPSK optical receiving circuit according to a second embodiment of the present invention.

FIG. 4 is a diagram showing a DQPSK optical receiving circuit according to a second embodiment of the present invention. A DQPSK optical receiving circuit 1A shown in FIG. 4 includes a selection control unit 6*d'* which is different from that shown in FIG. 1 and limiter amplifiers (LIAs) 6*f*-1, 6*f*-2, which are provided between a TIA 5-1 and a DFF 6*b* and between a TIA 5-2 and a DFF 6*c*, for identifying their levels respectively. Other structures are the same as those of the first embodiment and the reference numerals in FIG. 4 which are the same as FIG. 1 substantially represent the same elements. The reference numeral 8 represents electrical contacts.

The selection control unit 6*d'* includes a waveform monitor 6*dc* as a monitor, which is different from that in the first embodiment, and a control signal output unit 6*db* which is the same as in the first embodiment.

The waveform monitor 6*dc* is for monitoring waveform of each electronic signal which is output from balanced photodiodes 4-1, 4-2 as a light-electricity converter via the TIAs 5-1, 5-2. In more detail, it is composed of a power monitor for detecting average power of each electronic signal output from the balanced photodiodes 4-1, 4-2 via the TIAs 5-1, 5-2 respectively and a peak detection circuit for detecting a peak value of the respective electronic signals.

Figure 5A:
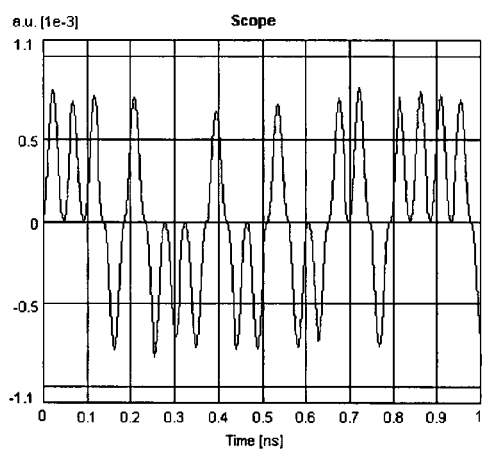
FIGS. 5A and 5B are explanatory diagrams of a waveform deterioration seen as peak value variations when there is a gap in an amount of phase shift.
Figure 5B:
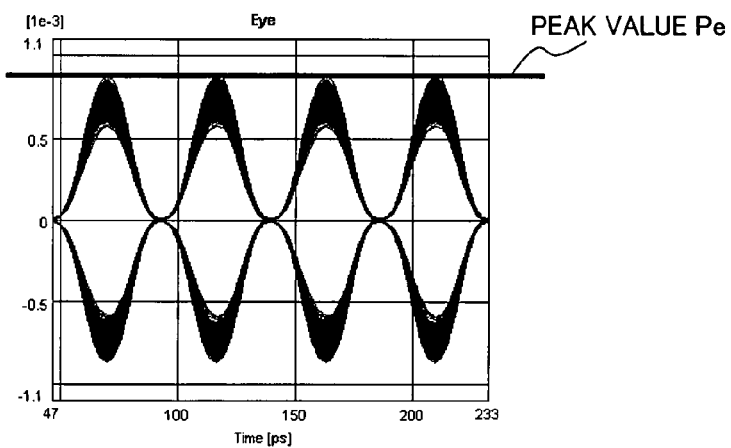
Figure 6A:
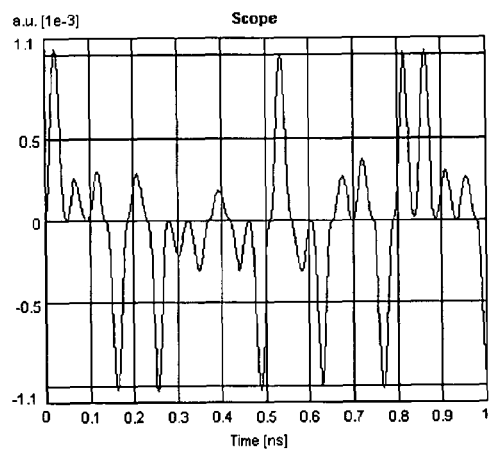
FIGS. 6A and 6B are explanatory diagrams of a waveform deterioration seen as peak value variations when there is a gap in an amount of phase shift.
Figure 6B:
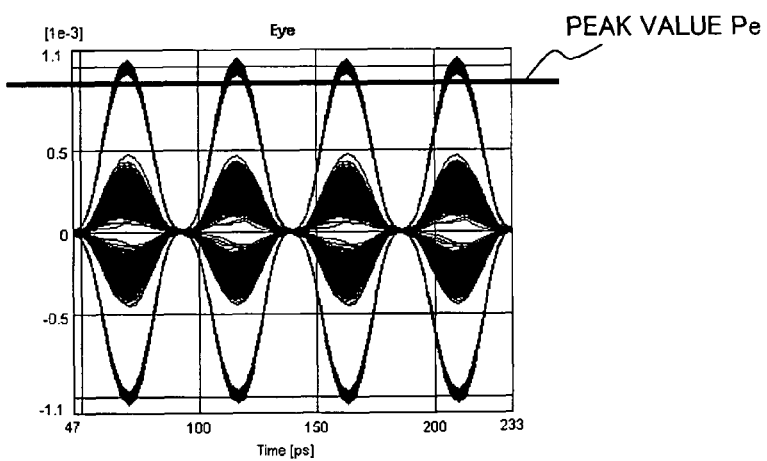

Here, the delay interferometers 3-1, 3-2 interfere (delay interfering) a delay element of a bit time and an element in which $\pi/4$rad, $-\pi/4$rad are phase controlled by voltage applied to an electrode to output two interference result. Here, when a substantial error (phase shift error Δ) is generated in phase control amount (amount of phase shift), a waveform deterioration as shown in FIGS. 6A and 6B is generated, compared to the case that such error is not generated (See FIGS. 5A and 5B). FIG. 5A shows a waveform of an electronic signal from the TIA 5-1 or 5-2 of a case that there is no phase shift error Δ and FIG. 6A shows a waveform of an electronic signal from the TIA 5-1 or 5-2 of a case that there is a phase shift error Δ. FIGS. 5B and 6B respectively show eye patterns of waveforms shown in FIGS. 5A and 6A.

That is, when the phase shift error Δ is generated, waveform deterioration is particularly seen as a variation of peak value as shown in FIGS. 5B and 6B although there is no substantial variation in average power value measured in the first embodiment. In FIGS. 5B and 6B, peak values in the case that phase shift error Δ are not generated is shown as Pe. It is considered that these waveform deteriorations may cause deterioration of extracted clock signal.

Accordingly, the waveform monitor 6*dc* of the second embodiment is configured to detect not only average powers same as the first embodiment but also variations of peak values of each electronic signal. With this, based on monitoring results from the waveform monitor 6*dc*, the control signal output unit 6*db* can output selection control signal to the data switching circuit 6*e* so as to extract a clock signal from an electronic signal in which a phase shift error has not occurred when a clock signal is being extracted from an electronic signal in which a phase shift error has occurred.

According to the second embodiment, since the LIAs 6*f*-1, 6*f*-2 are provided, it is preferable to extract a clock signal, which is used for digitizing the electronic signals of lines #1, #2 in the DFFs 6*b*, 6*c*, from one of outputs of the LIAs 6*f*-1, 6*f*-2. However, peak value variations are suppressed in the output of the LIAs 6*f*-1, 6*f*-2 when the waveforms are monitored by the waveform monitor 6*dc* monitors waveforms.

Therefore, it is preferable to detect waveforms of the signals of lines #1, #2 in the outputs from the TIAs 5-1, 5-2 before the LIAs 6f-1, 6f-2.

In the above-described DQPSK optical receiving circuit 1A according to the second embodiment, the received DQPSK modulated light is also demodulated in the optical front-ends of lines #1, #2.

That is, as the optical front-end of the line #1, the delay interferometer 3-1 performs a delay interfering process and the balanced photodiode 4-1 detects a light-electricity conversion so that an electronic signal (of line #1) in which the phase changes of π/4 and −3π/4 of optical signals are converted into intensity changes is output. On the other hand, as the optical front-end of the line #1, the delay interferometer 3-1 performs a delay interfering process and the balanced photodiode 4-1 detects a light-electricity conversion so that an electronic signal (of line #2) in which the phase changes of −π/4 and 3π/4 of the optical signals are converted into intensity changes is output.

In the DFFs 6b, 6c, the electronic signal of line #1 input from the balanced photodiode 4-1 via the TIA 5-1 and the LIA 6f-1 and the electronic signal of line #2 input from the balanced photodiode 4-2 via the TIA 5-2 and the LIA 6f-2 are respectively converted into digital signals synchronized with a common clock signal of frequency corresponding to a bit rate and the digital signals are output to the MUX 7. Here, the data switching circuit 6e receives the selection control signal (selection control signal output from the control signal output unit 6db according to monitoring results in the waveform monitor 6dc) from the selection control unit 6d' and output one of the electronic signals from the LIAs 6f-1, 6f-2 to the clock recovery 6a for extracting clock.

Figure 7:
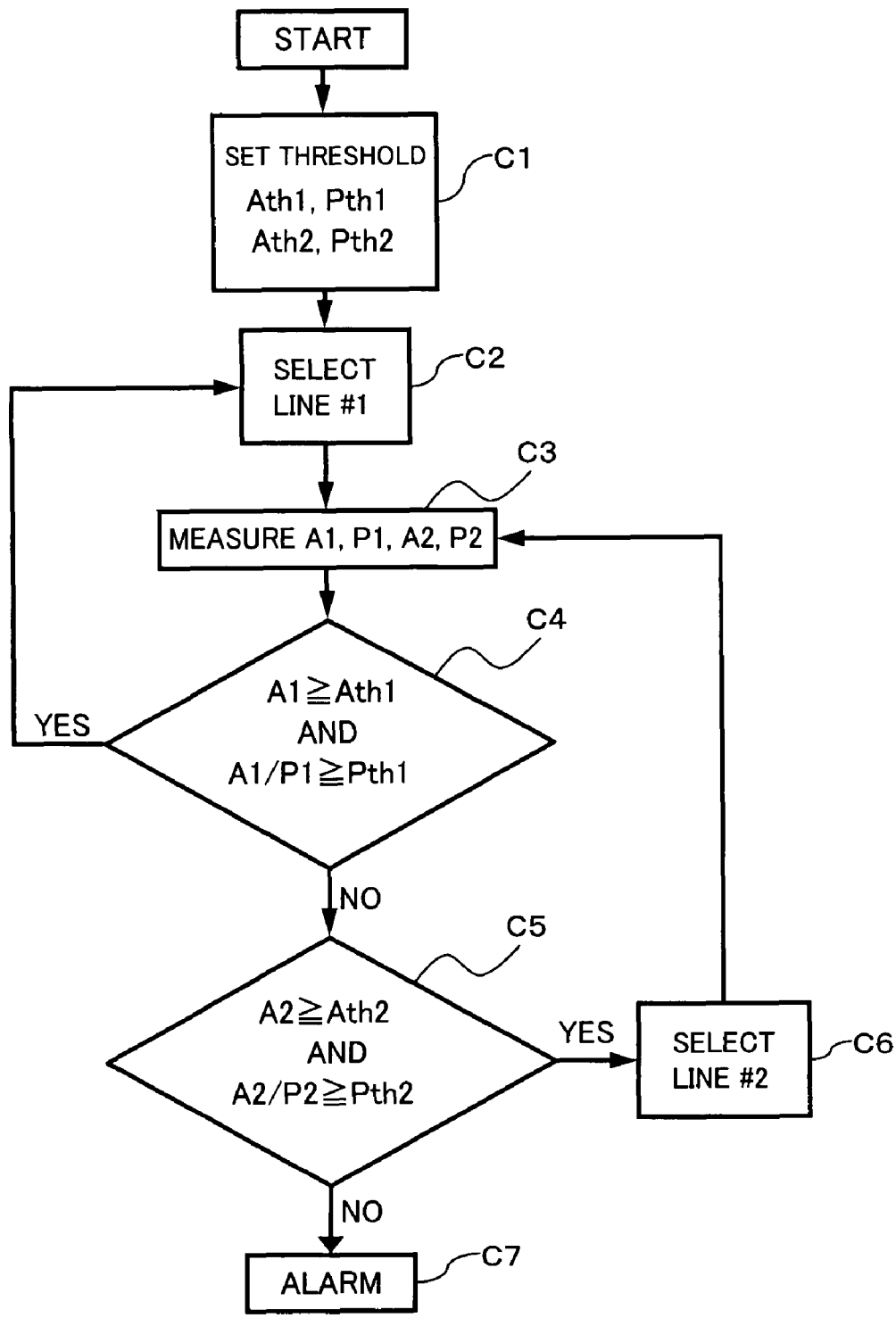
FIG. 7 is a flow chart of an example of a controlling aspect for a data switching circuit in a control signal output unit.

FIG. 7 is a flow chart showing an example of a controlling aspect for the data switching circuit 6e implemented by the control signal output unit 6db according to the monitoring results in the waveform monitor 6dc when the waveform monitor 6dc is provided in the selection control unit 6d' as described above.

Here, the waveform monitor 6dc is configured to detect average powers A1, A2 and peak detection values P1, P2 of the input signals of lines #1, #2 from the TIAs 5-1, 5-2 and output them as monitoring results. The control signal output unit 6db sets thresholds to be compared with the monitoring results A1, A2, P1, P2 as Ath1, Ath2, Pth1, Pth2 respectively (step C1). In this case, comparison using the peak values P1, P2 is performed with ratio of the peak values to the average power and with these comparison results, the degree of phase shift error caused by peak value variation is determined.

Firstly, the control signal output unit 6db outputs a selection control signal to the data switching circuit 6e so that the data switching circuit 6e selects signal of line #1 (by default) (step C2). The waveform monitor 6dc measures average powers A1, A2 and peak detection values P1, P2 of the electronic signals from the TIAs 5-1, 5-2 (step C3).

The control signal output unit 6db receives the monitoring results from the waveform monitor 6dc, compares the measured result A1 of the electronic signal from the LIA 5-1, which is a signal of the line selected by the data switching circuit 6e for extracting clock, with the threshold Ath1, and compares ratio value A1/P1 of the peak value P1 to the average power A1 with the corresponding threshold Pth1 (step C4).

According to the comparison results in the control signal output unit 6db, when the measured result A1 of the average power of the signal of line #1 and the A1/P1 are both equal to or greater than the thresholds Ath1 and Pth1 respectively (A1≧Ath1 and A1/P1≧Pth1), the measured result is considered to be normal. Thus, it is considered that the selection of signal of line #1 for extracting a clock signal is appropriate and the control signal output unit 6db does not output a selection control signal used to switch the selection to the data switching circuit 6e (step C4 to step C2 via route of "YES").

On the other hand, regarding the comparison between the measured result A1 of the average power of the signal of line #1 and the threshold Ath1 and the comparison between the A1/P1 and the threshold Pth1, when at least one of A1<Ath1 or A1/P1<Pth1 holds (A1<Ath1 and/or A1/P1<Pth1), it is considered that the gain property, the delay property, and phase shift error Δ in the optical front-end (reference numerals 3-1, 4-1) for outputting the signal of line #1 are out of an appropriate range and that selection of the signal of line #1 for extracting a clock signal is not appropriate. Accordingly, on the assumption that the monitoring result of the signal of line #2 is normal (A2≧Ath2, A2/P2≧Pth2), the data switching circuit 6e switches the signal used for extracting a clock signal from the electronic signal of line #1 to the electronic signal of line #2 (route of "NO" of step C4, step C5 to step C6 via route of "YES").

Here, when it is found that A2<Ath2 and/or A2/P2<Pth2 in the comparison between the monitoring results of the signal of line #2 and the thresholds and it is considered that the gain property, delay property, or phase shift error Δ of the optical front-end (reference numerals 3-2, 4-2) for outputting the signal of line #2 are out of an appropriate range, an alarm signal is output (step C5 to step C7 via route of "NO").

As described above, according to the second embodiment of the present invention, since the data switching circuit 6e as a selection unit can control the selection of an electronic signal used for generating a common clock signal in clock recovery 6a, there are the same advantages as described in the first embodiment. In addition, a peak value detected by the waveform monitor 6dc is used for the control of the data switching circuit 6e, the occurrence of phase control error in the delay interferometers 3-1, 3-2 may be a trigger of switching the clock signal and selection of a signal used for extracting a clock signal can be accurately switched to a signal with no deterioration. Therefore, there is an advantage that identification properties of the optical front-end unit composed of a plurality of lines can be improved.

(c) Third Embodiment

Figure 8:
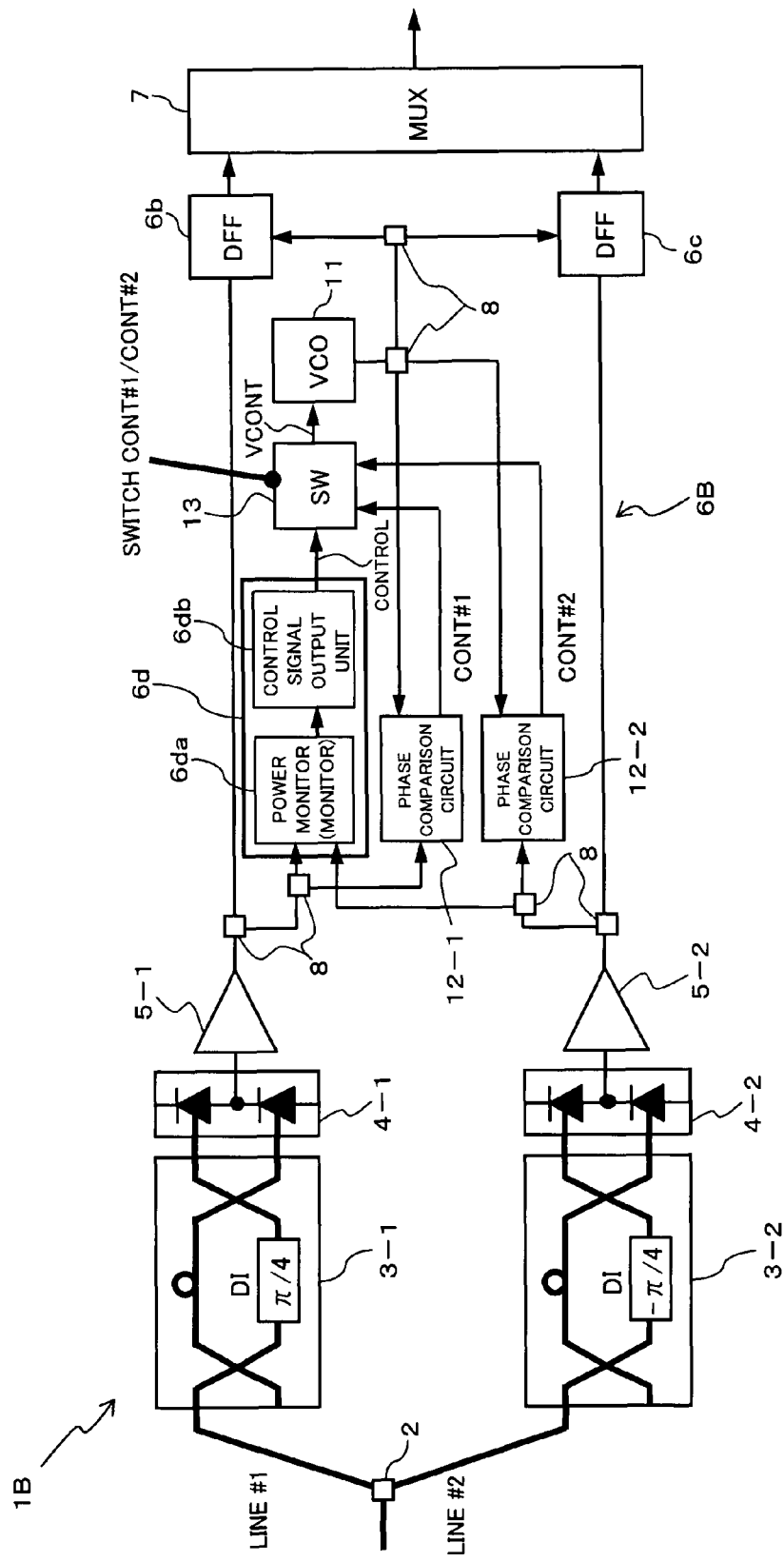
FIG. 8 is a diagram showing a DQPSK optical receiving circuit according to a third embodiment of the present invention.

FIG. 8 is a diagram showing a DQPSK optical receiving circuit 1B according to a third embodiment of the present invention. The DQPSK optical receiving circuit 1B of the third embodiment includes a digitization unit 6B which is different from that shown in FIGS. 1, 4, and 15; however its structure is the same as that of the first embodiment and the reference numerals in FIG. 8 which are same as in FIG. 1 represent the same elements. The digitization unit 6B includes DFFs 6b, 6c and a selection control unit 6d which are same as those in the above embodiments and also includes a voltage-controlled oscillator (VCO) 11, phase comparison circuits (phase comparison unit) 12-1, 12-2, and a switch (SW) 13. The reference numeral 8 represents electrical contacts.

The voltage-controlled oscillator 11 is a clock oscillation unit for generating a clock signal having frequency corresponding to a control voltage signal to be input. The phase comparison circuit 12-1 detects phase difference between the clock signal generated by the voltage-controlled oscillator 11 and electronic signal (electronic signal of line #1) output from the light-electricity converter 4-1 via the TIA 5-1 by comparing the phases and outputs a signal CONT#1 according to the phase difference. Similarly, the phase comparison circuit 12-2 detects phase difference between the clock signal generated by the voltage-controlled oscillator 11 and electronic signal (electronic signal of line #2) output from the light-electricity converter 4-2 via the TIA 5-2 by comparing the phases and outputs a signal CONT#2 according to the phase difference.

Further, the switch 13 receives the selection control signal from the control signal output unit 6db composing the selection control unit 6d and selectively outputs one of the signals CONT#1, CONT#2 which are corresponding to phase difference and received from the phase comparison circuits 12-1, 12-2, to the voltage-controlled oscillator 11 as a control voltage signal VCONT.

In other words, the switch 13 is a selection unit for selecting an electronic signal to be used for generating a common clock signal and supplies a signal corresponding to phase difference of an electronic signal selected under control of the selection control unit 6d in a plurality of signals corresponding to phase differences from the plurality of phase comparison circuits 12-1, 12-2 as a control voltage signal for a voltage-controlled oscillator 11.

With this, the voltage-controlled oscillator 11 can generate a clock signal having frequency controlled according to the selected control voltage signal VCONT and supply it to the DFFs 6b, 6c as a common clock signal. Therefore, the voltage-controlled oscillator 11 and a plurality of phase comparison circuits 12-1, 12-2 constitute a PLL (Phase Locked Loop) and a clock signal generation unit for generating a common clock signal to be used for generating a plurality of data signal in the DFFs 6b, 6c, with the use of one of the plurality of electronic signals output from the balanced photodiodes 4-1, 4-2 as a light-electricity converter.

In the above DQPSK optical receiving circuit 1B according to the third embodiment, the received DQPSK modulated light is also demodulated in each optical front-end #1, #2.

That is, as the optical front-end of the line #1, the delay interferometer 3-1 performs a delay interfering process and the balanced photodiode 4-1 detects a light-electricity conversion and outputs an electronic signal (of line #1) in which phase changes of π/4 and −3π/4 of the optical signals are converted into intensity changes. On the other hand, as the optical front-end of the line #1, the delay interferometer 3-1 performs a delay interfering process and the balanced photodiode 4-1 detects a light-electricity conversion and outputs an electronic signal (of line #2) in which the phase changes of −π/4 and 3π/4 of the optical signals are converted into intensity changes.

The digitization unit 6B converts the electronic signals of lines #1, #2 input via the TIAs 5-1, 5-2 into digital signals synchronized with a common clock signal of frequency corresponding to the bit rate and outputs it to the MUX 7. Here, the switch 13 receives a selection control signal (selection control signal output from the control signal output unit 6db corresponding to the monitoring result of the monitor 6da) from the selection control unit 6d and outputs one of the phase comparison results from the phase comparison circuits 12-1, 12-2 as a control voltage signal to the voltage-controlled oscillator 11.

With this, in the voltage-controlled oscillator 11, a common clock signal can be extracted from one of the electronic signals selected according to the monitoring results among the electronic signals of lines #1, #2.

According to the first and second embodiments, the clock recovery 6a is configured to selectively receive one of the electronic signals of lines #1, #2 from the TIAs 5-1, 5-2 or the LIAs 6f-1, 6f-2 and directly extract a clock signal from the electronic signal. In other words, switching in the data switching circuit 6e is for a signal itself which includes a data element, so the switching response is required to be implemented quickly corresponding to the data bit rate. When it is assumed that bit rate of data to be DQPSK modulated is, for example, 20 Gb/s×2, an element capable of switching response speed adapted to such a bit rate is now needed to be designed and it is difficult to employ a common switching element.

However, according to the third embodiment, the control voltage signal corresponding to the phase difference supplied to the voltage-controlled oscillator 11 may be sufficiently low frequency compared to the frequency corresponding to the bit rate. Accordingly, the voltage-controlled oscillator 11 can generate a common clock signal substantially same as the cases of the first and second embodiments. In addition, a switching performance of the switch 13 as a selection unit is not required as much as the performance of the data switching circuit 6e in the first or second embodiment. Thus, common switching element may be employed and the switching performance can be maintained.

As described above, according to the third embodiment of the present invention, through the switching of the switch 13 as a selection unit, an electronic signal to be used for generating a common clock signal can be selected. Thus, a clock signal used in both the DFFs 6b, 6c for digitizing the signals of lines #1, #2 can be extracted from signals having better properties and identification properties of signals from the optical front-end unit having two lines can be improved.

Further, the switch 13 can provide one of the signals related to phase differences from the phase comparison circuits 12-1, 12-2 by selectively switching as a control voltage signal to the voltage-controlled oscillator 11 so that the signal to be switched may have sufficiently low frequency compared to the frequency corresponding to the bit rate. Thus, function of the switch 13 can be composed of a common element so that the switching performance can be maintained.

(c1) Modification of Third Embodiment

Figure 9:
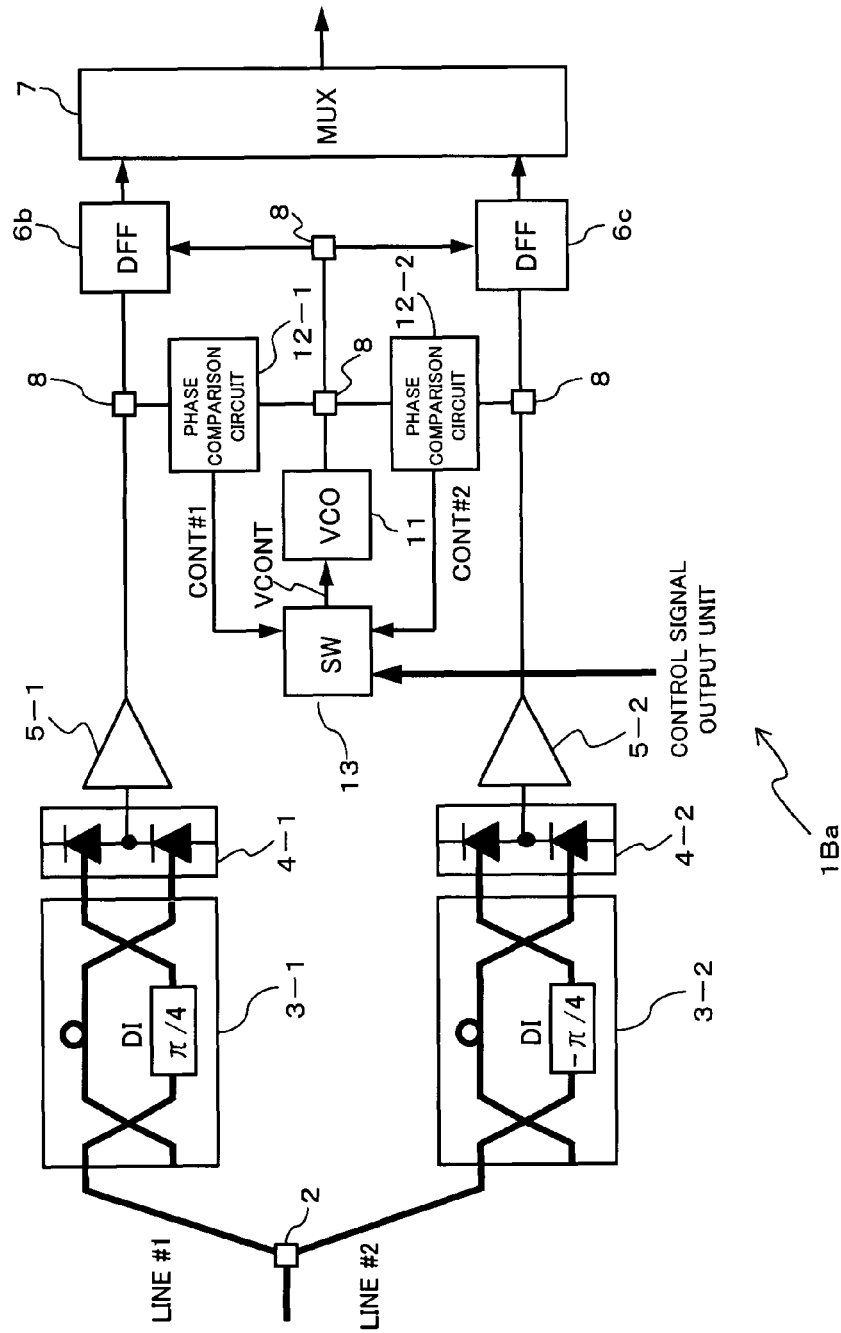
FIG. 9 is a diagram of a DQPSK optical receiving circuit according to a first modification of the third embodiment of the present invention.

FIG. 9 is a diagram showing a DQPSK optical receiving circuit 1Ba according to a first modification of the third embodiment of the present invention. The DQPSK optical receiving circuit 1Ba shown in FIG. 9 is different from that shown in FIG. 8 and the difference is that selection control for a switch 13 is implemented according to a selection control signal from outside. Reference numerals in FIG. 9 which are same as those in FIG. 8 represent substantially same elements. That is, with this selection control signal, a common clock signal output from the voltage-controlled oscillator 11 can be generated based on phase comparison results about electronic signals from a line having deteriorated property and electronic signals from other lines. Accordingly, same advantages as the above third embodiment can be obtained.

Figure 10:
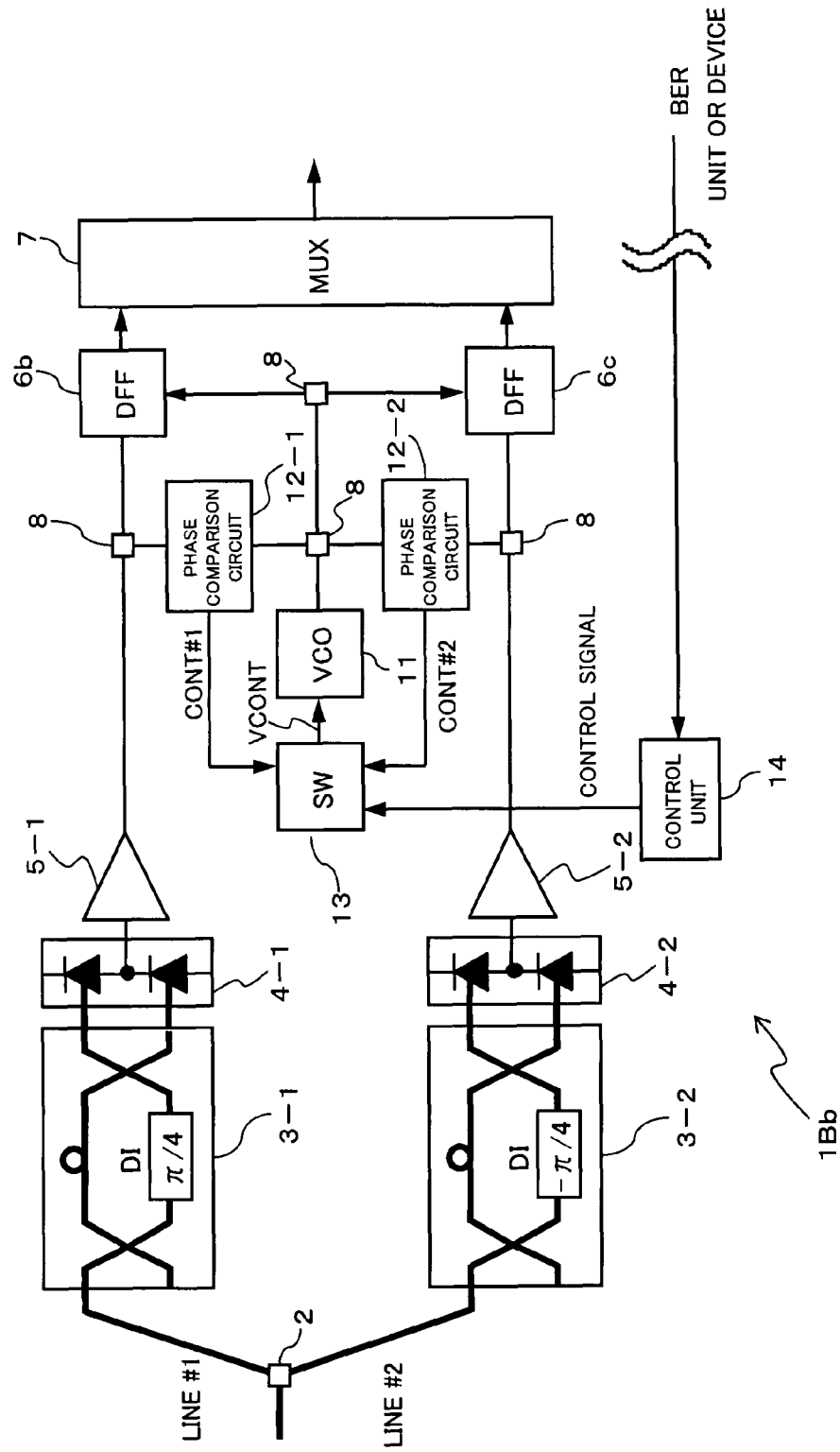
FIG. 10 is a diagram of a DQPSK optical receiving circuit according to a second modification of the third embodiment of the present invention.

Further, FIG. 10 is a diagram showing a DQPSK optical receiving circuit 1Bb according to a second modification of the third embodiment of the present invention. The DQPSK optical receiving circuit 1Bb shown in FIG. 10 is different from that shown in FIG. 8. The difference is that a bit error rate (BER) of data reproduced in the DFFs 6b, 6c is input and a selection control unit 14 for implementing selection control for the switch 13 is configured to implement selection control of the switch 13 according to the input BER. Reference numerals in FIG. 9 which are the same as those in FIG. 8 represent substantially same elements.

Figure 11:
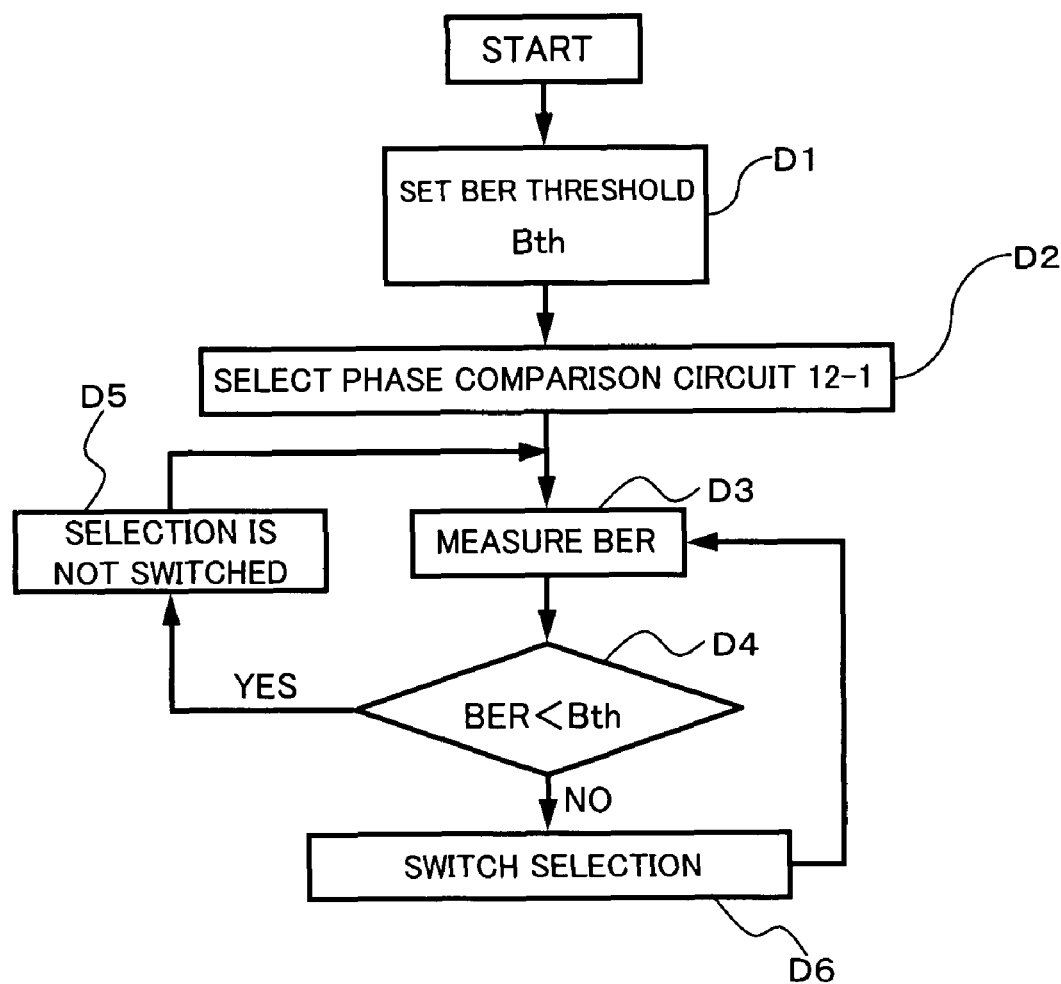
FIG. 11 is a flow chart showing an example of a selection controlling aspect for a switch in a selection control unit of the DQPSK optical receiving circuit shown in FIG. 10.

FIG. 11 is a flow chart of an example of a selection controlling aspect for the switch 13 implemented by the selection control unit 14. As shown in FIG. 11, the selection control unit 14 sets a threshold Bth to be compared with the BER (step D1) and controls the switch 13 so that a phase difference signal from the phase comparison circuit 12-1 is output to the voltage-controlled oscillator 11 by default (step D2).

Then, the selection control unit 14 loads a measured result of bit error rate BER of data reproduced by the common clock signal generated in the voltage-controlled oscillator 11 with the use of the phase difference signal from the phase comparison circuit 12-1 (step D3) and compares the value of the loaded BER with the threshold Bth (step D4). When the value of the loaded BER is equal to or greater than the threshold Bth, the phase difference signal used for extracting a clock signal is not switched (step D4 to step D5 "selection is not switched" via route of "YES"). However, when the value of the loaded BER is smaller than the threshold Bth, a selection control signal used for switching the phase difference signal being used for extracting a clock signal is output to the switch 13. Accordingly, the voltage-controlled oscillator 11 can generate a common clock signal from the phase difference signal from the phase comparison circuit 12-2 (step D4 to step D6 "switch selection" via route of "NO"). Here, the selection control unit 14 continues to load the BER to compare with the same threshold and performs a selection control of the switch 13 in order to switch phase difference signals according to the comparison results (steps D3 to D6).

Therefore, the selection control unit 14 can perform switching control of the switch 13 as a selection unit according to the bit error rate of the data reproduced in the DFFs 6b, 6c so that an electronic signal to be used for generating a common clock signal can be selected by the switch 13. Accordingly, a clock signal used in both the DFFs 6b, 6c for digitizing signals of lines #1, #2 can be extracted from signals having better properties so that the same advantage as the third embodiment can be achieved.

(d) Fourth Embodiment

Figure 12:
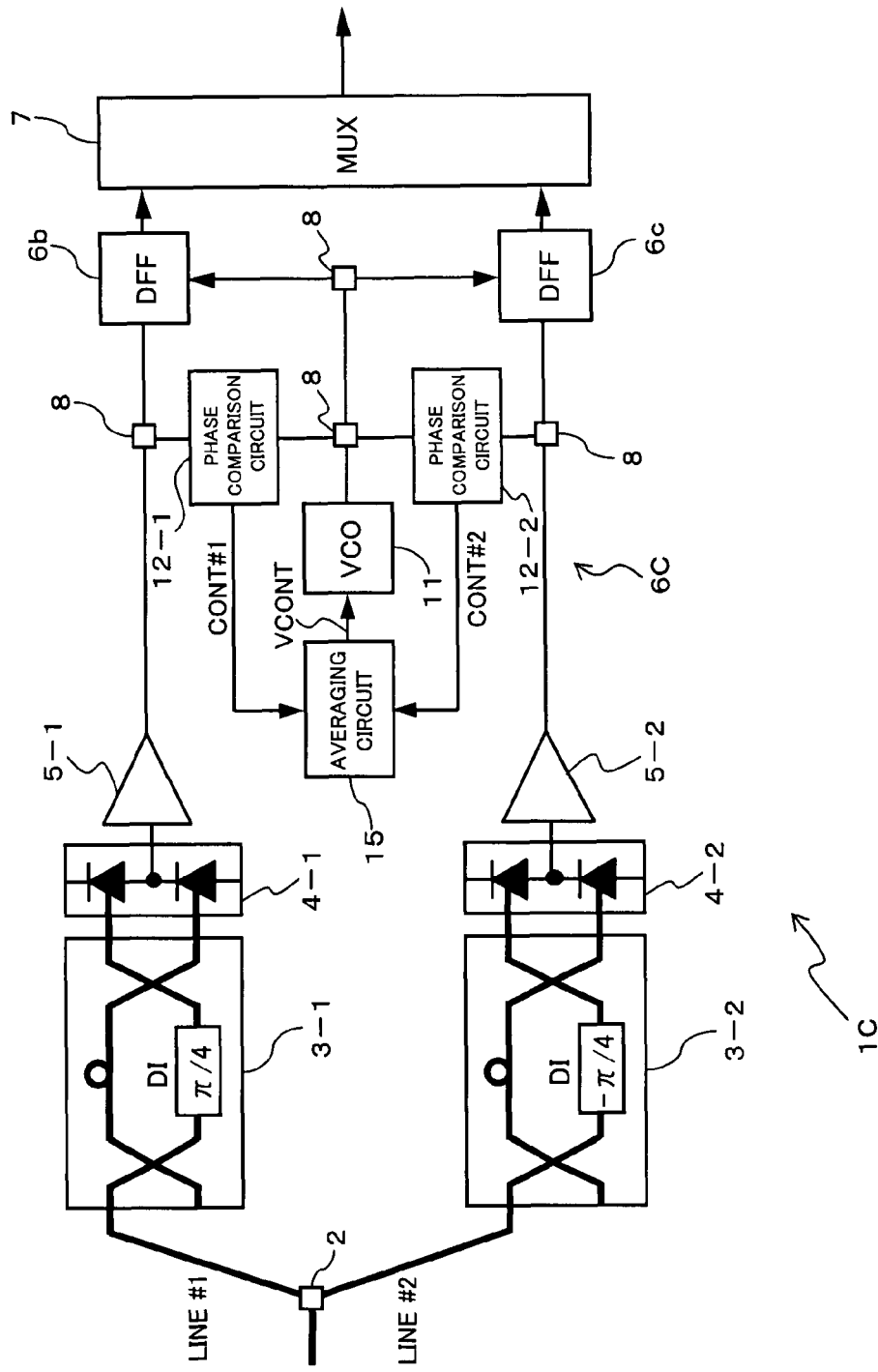
FIG. 12 is a diagram showing a DQPSK optical receiving circuit according a fourth embodiment of the present invention.

FIG. 12 is a diagram showing a DQPSK optical receiving circuit 1C according to a fourth embodiment of the present invention. The DQPSK optical receiving circuit 1C shown in FIG. 12 includes a digitization unit 6C which is different from that of the third embodiment (see FIG. 8), but the other elements are the same as those of the third embodiment. Reference numerals in FIG. 12 which are same as those in FIG. 8 represent substantially same elements. Here, the digitization unit 6C includes DFFs 6b, 6c, a voltage-controlled oscillator (VCO) 11, and phase comparison circuits 12-1, 12-2 which are same as the third embodiment and, in addition, the digitization unit 6C includes an averaging circuit 15. The reference numeral 8 represents electrical contacts.

The averaging circuit 15 is an average calculation circuit for calculating an average of value of a signal (voltage signal) according to each phase difference (in this case, (CONT#1+ CONT#2)/2) from the phase comparison circuits 12-1, 12-2 and supplying the signal (voltage signal) of calculation result to the voltage-controlled oscillator 11 as a control voltage signal VCONT. With this, the voltage-controlled oscillator 11 is configured to supply a clock signal generated according to the control voltage signal from the averaging circuit 15 to the DFFs 6b, 6c as a common clock signal.

The voltage-controlled oscillator 11, the phase comparison circuits 12-1, 12-2 and the averaging circuit 15 constitute a clock signal generation unit for generating a common clock signal to be used for reproducing two data signals in the DFFs 6b, 6c.

In the above-described DQPSK optical receiving circuit 1C according to the fourth embodiment, also, the received DQPSK modulated light is demodulated in the optical front-end of lines #1, #2, respectively.

That is, as the optical front-end of the line #1, the delay interferometer 3-1 performs a delay interfering process and the balanced photodiode 4-1 detects a light-electricity conversion and outputs an electronic signal (of line #1) in which phase changes of $\pi/4$ and $-3\pi/4$ of optical signals are converted into intensity change. On the other hand, as the optical front-end of the line #1, the delay interferometer 3-1 performs a delay interfering process and the balanced photodiode 4-1 detects a light-electricity conversion and outputs an electronic signal (of line #2) in which the phase changes of $-\pi/4$ and $3\pi/\propto$ of optical signal are converted into intensity change.

Then, the digitization unit 6C converts the electronic signals of lines #1, #2 input through the TIAs 5-1, 5-2 into digital signals synchronized with a common clock signal having frequency corresponding to the bit rate and outputs it to the MUX 7. Here, the voltage-controlled oscillator 11 is configured to generate the common clock signal.

Further, the voltage-controlled oscillator 11 generates clock signal based on the average voltage signal VCONT of the control voltage signals CONT#1, CONT#2 from the phase comparison circuits 12-1, 12-2, which are calculated by the averaging circuit 15. While the phase comparison circuit 12-1 outputs a voltage signal having a phase error element of line #1, the phase comparison circuit 12-2 outputs a voltage signal having a phase error element of line #2. By calculating the average of the voltage signal in the averaging circuit 15, a voltage signal in which the phase error elements in the electronic signals of lines #1, #2 are relatively averaged can be obtained.

In the voltage-controlled oscillator 11, a voltage signal in which phase error element is averaged by the above calculation in the averaging circuit 15 as described above can be loaded as a control voltage signal VCONT. Accordingly, common identification timing can be set to an intermediate timing in the optical identification timings of each DFFs 6b, 6c so that a substantial phase margin of identification timing of the electronic signal in another line can be improved compared to a case that a clock signal is extracted from an electronic signal of only one line.

As described above, according to the fourth embodiment of the present invention, the averaging circuit 15 calculates an average of values of signals corresponding to phase differences from the plurality of phase comparison circuits 12-1, 12-2 and supplies a signal of the calculation result to the voltage-controlled oscillator 11 as a control voltage signal VCONT and the voltage-controlled oscillator 11 supplies clock signal generated according to the control voltage signal VCONT from the averaging circuit 15 to the DFFs 6b, 6c as a common clock signal. Accordingly, there are advantages that identification properties of signals from optical front-end unit having two lines can be improved and that a substantial phase margin of identification timing for electronic signal in another line can be improved, compared to a case a clock signal is extracted from an electronic signal of only one line.

(d1) Modification of Fourth Embodiment

Figure 13:
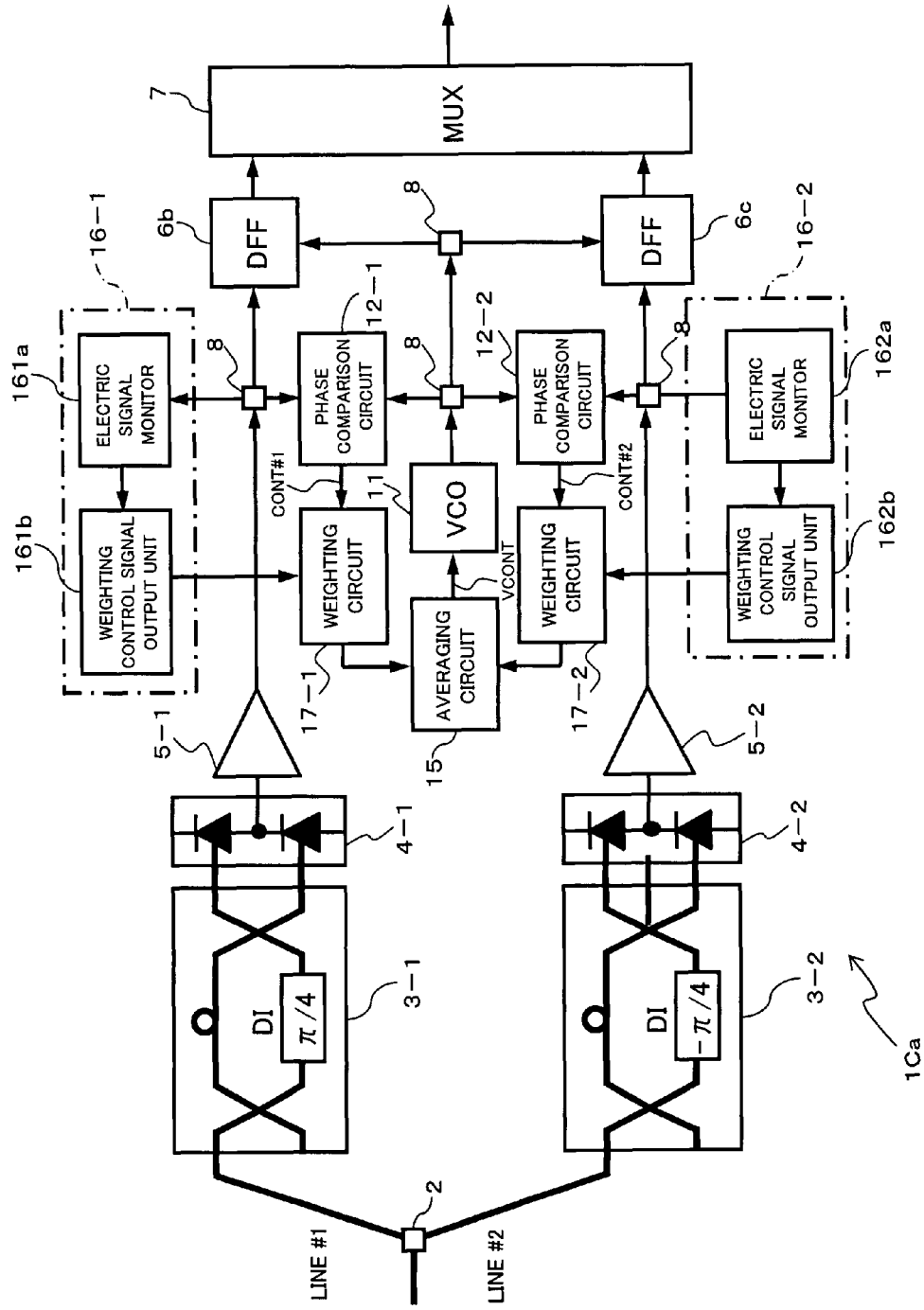
FIG. 13 is a diagram showing a DQPSK optical receiving circuit according to a first modification of the fourth embodiment of the present invention.

FIG. 13 is a diagram showing a DQPSK optical receiving circuit 1Ca according to a first modification of the fourth embodiment. The DQPSK optical receiving circuit 1Ca shown in FIG. 13 includes weighting control units 16-1, 16-2 and weighting circuit 17-1, 17-2 in addition to the structure described in the fourth embodiment (See FIG. 12). Reference numerals in FIG. 13 which are the same in FIG. 12 represent substantially same elements.

The weighting circuits 17-1, 17-2 are weighting units for respectively weighting signals (voltage signals CONT#1, CONT#2) having phase differences output from the phase comparison circuits 12-1, 12-2. The weighting control units 16-1, 16-2 control the weightings given from the weighting circuits 17-1, 17-2. With this, the averaging circuit 15 is configured to calculate an average of voltage signals having values corresponding to phase differences, which are weighted by the weighting units 17-1, 17-2.

The weighting control unit 16-1 includes an electronic signal monitor 161a for monitoring an electronic signal (of line #1) output from the balanced photodiode 4-1 as a light-electricity converter via the TIA 5-1 and a weighting control signal output unit 161b for outputting a control signal for controlling weighing given to the weighting circuit 17-1 according to the monitoring results from the electronic signal monitor 161a.

Similarly, the weighting control unit 16-2 includes an electronic signal monitor 162a for monitoring an electronic signal (of line #2) output from the balanced photodiode 4-2 as a light-electricity converter via the TIA 5-2 and a weighting control signal output unit 162b for outputting a control signal for controlling weighing given to the weighting circuit 17-2 according to the monitoring results from the electronic signal monitor 162a.

With this structure, the weighting circuits 17-1, 17-2 are configured to be weighted by phase difference signals from the phase comparison circuits 12-1, 12-2 with an amount according to control signals from the weighting control signal output units 161b, 162b.

That is, the control signal output units 161b, 162b in the weighting control units 16-1, 16-2 work together so as to constitute a weighting control signal output unit for outputting a control signal for giving weighting, at the weighting circuits 17-1, 17-2, individually to signals having values corresponding to phase differences output from the plurality of phase comparison circuits 12-1, 12-2, according to the monitoring results in the electronic signal monitors 161a, 162a.

Further, for example, when any problem is detected in the electronic signals of lines #1, #2 according to the monitoring results from the electronic signal monitors 161a, 162a in the weighting control units 16-1, 16-2, the weighting of the signal in which the problem is detected is set to "0" so that, in the control voltage signal supplied to the voltage-controlled oscillator 11, phase difference signal from the phase comparison circuit in the line in which the problem is detected can be substantially set to "0." This prevents the detected problem from affecting a common signal to be generated.

Therefore, according to the DQPSK optical receiving circuit 1Ca shown in FIG. 13, there are same advantage as the fourth embodiment. In addition, since variations of properties of the optical front-end having a plurality of lines are monitored with conditions of signals from each line and the weightings of phase difference signals (voltage signals) whose average is flexibly calculated according to the property variations are changed, the influence of the property variations can be suppressed.

Figure 14:
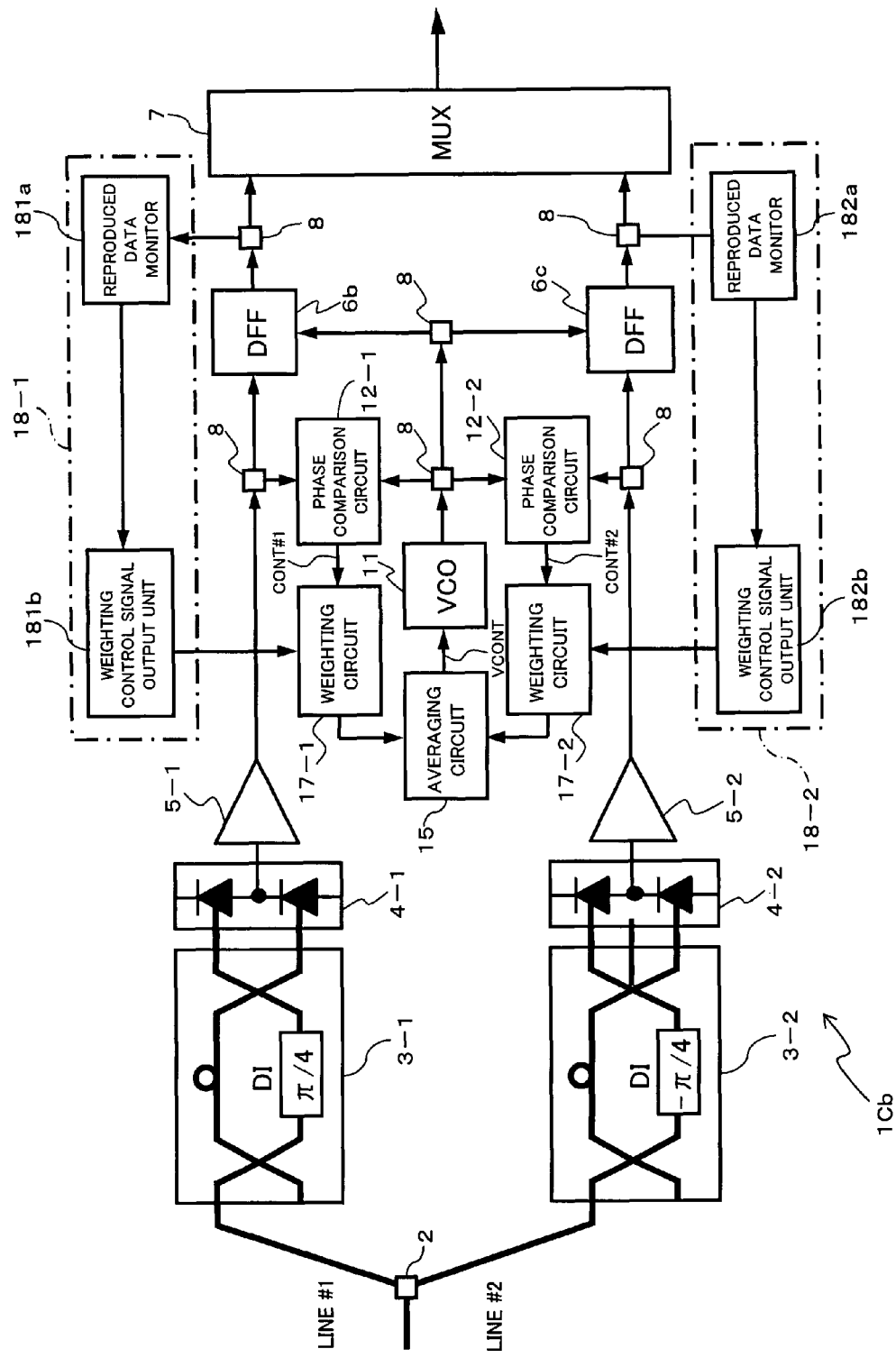
FIG. 14 is a diagram showing a DQPSK optical receiving circuit according to a second modification of the fourth embodiment of the present invention.

As a second modification of the fourth embodiment, as shown in FIG. 14, weighting control units 18-1, 18-2 which is different from that in FIG. 13 (reference numerals 16-1, 16-2) may be provided. In the DQPSK optical receiving circuit 1Cb shown in FIG. 14, reference numerals which are the same as in FIG. 13 represent substantially same elements.

Here, the weighting control unit 18-1 includes a reproduced data monitor 181a for monitoring data signal reproduced in the DFF 6b and a weighting control signal output unit 181b for outputting control signal for controlling, at the weighting circuit 17-1, weighting signals having values corresponding to the phase differences output from the phase comparison circuit 12-1, according to the monitoring results from the reproduced data monitor 181a.

Similarly, the weighting control unit 18-2 includes a reproduced data monitor 182a for monitoring data signal reproduced in the DFF 6c and a weighting control signal output unit 182b for outputting control signal for controlling, at the weighting circuit 17-2, weighting signals having values corresponding to the phase differences output from the phase comparison circuit 12-2, according to the monitoring results from the reproduced data monitor 182a.

With this structure, the weighting circuits 17-1, 17-2 are configured to weight phase difference signals from the phase comparison circuits 12-1, 12-2 respectively with an amount based on the control signals from the weighting control signal output units 181b, 182b.

That is, the control signal output units 181b, 182b of the weighting control units 18-1, 18-2 work together so as to constitute a weighting control signal output unit for outputting control signals for giving weighting, at weighting circuit 17-1, 17-2, respectively to signals having phase difference output from a plurality of phase comparison circuits 12-1, 12-2, according to the monitoring results from the reproduced data monitors 181a, 182a.

Further, similarly to the case of FIG. 13, for example, when any problem is detected in a reproduction data of lines #1, #2 based on monitoring results from the reproduced data monitors 181a, 182a in the weighting control units 18-1, 18-2, the weighting of the signal in which the problem is detected is set to "0" so that, in the control voltage signal supplied to the voltage-controlled oscillator 11, phase difference signal from the phase comparison circuit in the line in which the problem is detected can be substantially set to "0." This prevents the detected problem in the reproduction data affecting a common signal to be generated from the electronic signals before reproduced (the electronic signals output from TIA 5-1, 5-2.

Therefore, according to the DQPSK optical receiving circuit 1Cb, shown in FIG. 14, the same advantage as the fourth embodiment can be obtained. In addition, since property variations of optical front-end having a plurality of lines are monitored with conditions of signals of each line and weightings of the phase difference signals (voltage signals) whose average is flexibly calculated according to property variations are changed, the influence of the property variations can be suppressed.

(e) Others

According to the above-described embodiments, a differential quadrature phase shift keying optical receiving circuit in which n=2 (M=4) is explained; however, the present invention should not be limited to this and the present invention may be applied to a differential M phase shift keying optical receiving circuit in which $M=2^n$ where n is an integer that is equal to or larger than 3.

Further, according to the above-described embodiments, examples in which a power monitor 6da and a waveform monitor 6dc are employed as a monitor for monitoring two electronic signals output from TIAs 5-1, 5-2 constituting a light-electricity converter are described; however, the present invention should not be limited to this and other structures may be employed.

What is claimed is:

1. A differential M phase shift keying optical receiving circuit for receiving an optical signal which is differential M phase modulated upon $M=2^n$ where n is an integer equal to or greater than 2, comprising:
   a light-electricity converter for outputting a plurality of electronic signals in which phase-modulated element is intensity modulated from a received optical signal;
   a data reproduction unit for reproducing a plurality of data signals synchronized with a common clock signal from the plurality of electronic signals output from the light-electricity converter;
   a clock signal generation unit for generating the common clock signal to be used for reproducing the plurality of data signals in the data reproduction unit with the use of one of the plurality of electronic signals output from the light-electricity converter; and
   a selection unit for selecting the one of the plurality of electronic signals to be used for generating the common clock signal in the clock signal generation unit.

2. The differential M phase shift keying optical receiving circuit according to claim 1, wherein the clock signal generation unit is a clock signal extraction unit for extracting a clock signal element included in the electronic signal selected in the selection unit and for supplying the extracted clock signal element to the data reproduction unit as the common clock signal.

3. The differential M phase shift keying optical receiving circuit according to claim 1, wherein
   the clock signal generation unit includes a clock oscillation unit for generating a clock signal having frequency corresponding to an input control signal and a plurality of phase comparison units for detecting a phase difference between a clock signal generated in the clock oscillation unit and the plurality of electronic signals output from the light-electricity converter by a phase comparison and for outputting a signal corresponding to the phase difference;
   the selection unit is configured to supply a signal corresponding to the phase difference of the electronic signal selected among the signals from the plurality of phase comparison units as the control signal addressed to the clock oscillation unit; and
   the clock oscillation unit supplies a clock signal generated corresponding to the control signal from the selection unit to the data reproduction unit as the common clock signal.

4. The differential M phase shift keying optical receiving circuit according to claim 1, further comprising a selection control unit for controlling a selection of the electronic signal to be used for generating the common clock signal in the selection unit.

5. The differential M phase shift keying optical receiving circuit according to claim 4, wherein the selection control unit includes a monitor for monitoring the plurality of electronic signals output from the light-electricity converter and a control signal output unit for outputting a control signal for controlling the selection of the electronic signal in the selection unit based on a monitoring result in the monitor.

6. The differential M phase shift keying optical receiving circuit according to claim 5, wherein the monitor is composed of a power monitor for monitoring an average power of each electronic signal output from the light-electricity converter.

7. The differential M phase shift keying optical receiving circuit according to claim 6, wherein the control signal output unit of the selection control unit outputs the control signal to the selection unit so as to select an electronic signal having a largest average power based on the average power monitoring result.

8. The differential M phase shift keying optical receiving circuit according to claim 6, wherein the control signal output unit of the selection control unit selects one of the plurality of electronic signals by default and outputs the control signal to the selection unit so as to switch the selection to another electronic signal other than the selected electronic signal when an average power of the selected electronic signal is equal to or smaller than a predetermined threshold.

9. The differential M phase shift keying optical receiving circuit according to claim 5, wherein the monitor is composed of a waveform monitor for monitoring a waveform of each electronic signal output from the light-electricity converter.

10. The differential M phase shift keying optical receiving circuit according to claim 9, wherein the waveform monitor detects an average power of each electronic signal output from the light-electricity converter and a peak value of each electronic signal output from the light-electricity converter.

11. The differential M phase shift keying optical receiving circuit according to claim 10, wherein the selection control unit controls the selection unit so as to select one of the plurality of electronic signals by default and to switch the selection to another electronic signal other than the selected electronic signal when an average power detected by the waveform monitor and a peak value detected by the peak detection circuit of the selected electronic signal are respectively equal to or smaller than the predetermined threshold.

12. The differential M phase shift keying optical receiving circuit according to claim 4, wherein the selection control unit controls the selection in the selection unit according to a bit error rate of data reproduced by the data reproduction unit.

13. The differential M phase shift keying optical receiving circuit according to claim 1, wherein
   n is set as 2 so that M=4;
   the light-electricity converter outputs two electronic signals in which phase-modulated element is intensity modulated from the received optical signal;
   the data reproduction unit reproduces two data signals synchronized with the common clock signal from the two electronic signals output from the light-electricity converter;
   the clock signal generation unit generates the common clock signal to be used for reproducing the two data signals in the data reproduction unit with the use of one of the two electronic signals output from the light-electricity converter; and
   the selection unit selectively outputs one of the two electronic signals output from the light-electricity converter to the clock signal generation unit for generating the common clock signal.

* * * * *